United States Patent
Mukherjee et al.

(10) Patent No.: US 10,656,823 B2
(45) Date of Patent: May 19, 2020

(54) METHOD AND ELECTRONIC DEVICE FOR MANAGING OPERATION OF APPLICATIONS

(71) Applicant: SAMSUNG ELECTRONICS CO., LTD., Suwon-si (KR)

(72) Inventors: Debayan Mukherjee, Bangalore (IN); Mannu Amrit, Bangalore (IN); Preksha Shukla, Bangalore (IN); Sowmya Radhakrishnan Iyer, Bangalore (IN); Swadha Jaiswal, Bangalore (IN); Saumitri Choudhury, Bangalore (IN); Akhilesh Parmar, Bangalore (IN); Rahul Chaurasia Kumar, Bangalore (IN); Suresh Kumar Gara, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 415 days.

(21) Appl. No.: 15/425,020

(22) Filed: Feb. 6, 2017

(65) Prior Publication Data

US 2017/0228127 A1 Aug. 10, 2017

(30) Foreign Application Priority Data

Feb. 5, 2016 (IN) ............................ 201641004226
Aug. 10, 2016 (IN) ............................ 201641004226

(51) Int. Cl.
*G06F 3/0488* (2013.01)
*G06F 9/451* (2018.01)
(Continued)

(52) U.S. Cl.
CPC ........ *G06F 3/0488* (2013.01); *G06F 3/04842* (2013.01); *G06F 9/451* (2018.02);
(Continued)

(58) Field of Classification Search
CPC .... G06F 3/0488; G06F 3/04842; G06F 9/542; G06F 9/546
See application file for complete search history.

(56) References Cited

U.S. PATENT DOCUMENTS

2011/0080356 A1 * 4/2011 Kang .................... G06F 3/0486
345/173
2012/0268611 A1 10/2012 Kimijima et al.
(Continued)

FOREIGN PATENT DOCUMENTS

JP 5736933 B2 6/2015
KR 1020140054666 A 5/2014
(Continued)

OTHER PUBLICATIONS

Baladad, "Get Floating Notifications & App Windows on Your Samsung Galaxy S4", published: Jan. 31, 2014, gadgethacks.com, https://gs4.gadgethacks.com/how-to/get-floating-notifications-app-windows-your-samsung-galaxy-s4-0150668/ (Year: 2014).*

(Continued)

*Primary Examiner* — Seth A Silverman
(74) *Attorney, Agent, or Firm* — Sughrue Mion, PLLC

(57) ABSTRACT

A method for managing operations of applications includes identifying a first application which is active on the electronic device and an event; and displaying an action element associated with a non-active second application on the first application based on the event. The action element of the second application is dynamically driven based on at least one among a context of the first application and a content of the first application.

18 Claims, 33 Drawing Sheets

(51) Int. Cl.
  *G06F 3/0484* (2013.01)
  *G06F 9/54* (2006.01)
  *G06Q 10/10* (2012.01)
  *G06Q 50/00* (2012.01)

(52) U.S. Cl.
  CPC .............. *G06F 9/542* (2013.01); *G06F 9/546* (2013.01); *G06Q 10/10* (2013.01); *G06Q 50/01* (2013.01)

(56) References Cited

U.S. PATENT DOCUMENTS

| | | |
|---|---|---|
| 2014/0267796 A1 | 9/2014 | Jang et al. |
| 2014/0320724 A1 | 10/2014 | Kim et al. |
| 2014/0331158 A1 | 11/2014 | Hicks et al. |
| 2016/0062598 A1 | 3/2016 | Kocienda et al. |

FOREIGN PATENT DOCUMENTS

| | | |
|---|---|---|
| KR | 1020140127507 A | 11/2014 |
| KR | 1020140136746 A | 12/2014 |
| KR | 101586688 B1 | 1/2016 |

OTHER PUBLICATIONS

Android Plazza, ("Floatifications: Review | How to get floating notifications| Android Plazza", herein referred to as AP, published: Aug. 20, 2014, youtube.com, https://www.youtube.com/watch?v=aSCwAtqhvWU, time=0:53, 1:17 and 1:47-2:09 min (Year: 2014).*

Communication dated May 16, 2017, issued by the International Searching Authority in counterpart International Application No. PCT/KR2017/001303 (PCT/ISA/210 & PCT/ISA/237).

Search Report dated Nov. 26, 2018 by the European Patent Office in counterpart European Patent Application No. 17747840.1.

Communication dated Sep. 12, 2019, issued by the European Patent Office in counterpart European Application No. 17 747 840.1.

* cited by examiner

METHOD AND ELECTRONIC DEVICE FOR MANAGING OPERATION OF APPLICATIONS

CROSS-REFERENCE TO RELATED APPLICATIONS

This application claims priority from Indian Provisional Application No. 201641004226, filed on Feb. 5, 2016 and Indian Patent Application No. 201641004226, filed on Aug. 10, 2016 in the Intellectual Property India, the disclosures of which are incorporated by reference herein in their entireties.

BACKGROUND

1. Field

Apparatuses and methods consistent with exemplary embodiments relate to electronic devices and, more particularly, to managing operations of applications in the electronic device.

2. Description of Related Art

In general, sharing objects, such as media, files, application contextual related information with contacts of a user has become increasingly popular as the use of media/file share applications, Internet, and Social Networking Sites (SNS) has grown. One of the problems in related art systems is addressing application actions with respect to the contacts. The application actions with respect to the contacts involve multiple steps which may be cumbersome.

For example, the related art systems provide contextual applications and application generation, but it takes considerable time in performing application contextual actions such as sharing, tagging, searching, etc., in an application.

Thus, a more efficient method of sharing the objects to the contacts of the user is desirable.

SUMMARY

Exemplary embodiments may address at least the above problems and/or disadvantages and other disadvantages not described above. Also, the exemplary embodiments are not required to overcome the disadvantages described above, and may not overcome any of the problems described above.

In accordance with an aspect of an exemplary embodiment, a method is provided for managing operations of applications in an electronic device. The method includes detecting, by the electronic device, a first application which is active; detecting, by the electronic device, an event; causing, by the electronic device, to display at least one action element associated with at least one non-active second application on the first application based on the event, wherein the at least one action element of the at least one second application is dynamically driven based on a context and a content of the first application.

The method further includes detecting, by the electronic device an user input and performing at least one action on the second application and on the first application (i.e., content of the first application) of the electronic device based on the user input.

The action includes at least one of sharing the content of the first application with at least one second application, searching for a data item associated with the second application in the content of the first application, adding a data item associated with the second application in the first application, create an event associated with the first application based on a data item associated with the second application, opening a data item specific interface of the second application, and moving the content of the first application to the second application.

The user input is performed and detected on at least one of an action element of the first application and the at least one action element of the second application.

The context of the first application is determined based on at least one of frequently accessed data items, nearby data items, events associated with data items of the electronic device, data items recognized in the content of the first application displayed on the screen of the electronic device, data items tagged in the content of the first application displayed on the screen of the electronic device, and user favorite data items.

The action element includes an indication of a data item associated with at least one second application.

The indication of a data item associated with the at least one second application includes an indication of a data item associated with at least one third application.

In accordance with another aspect of an exemplary embodiment, a method is provided for managing operations of applications in an electronic device. The method includes detecting a first application which is active on the electronic device; detecting, by the electronic device, at least one non-active second application related to the first application through an event; causing, by the electronic device, to display at least one action element on the first application, wherein in response to a user input on the action element, a content interaction is performed linking the first application and the second application.

The event is at least one of frequently accessed data items, nearby data items, events associated with data items of the electronic device, data items recognized in the content of the first application displayed on the screen of the electronic device, data items tagged in the content of the first application displayed on the screen of the electronic device, and user favorite data items.

The user input includes at least one of a touch input, a tap input, a force touch input, a drag input and a long press input.

The content interaction includes at least one of sharing the content of the first application with at least one second application, searching for a data item associated with the second application in the content of the first application, adding a data item associated with the second application in the first application, create an event associated with the first application based on a data item associated with the second application, opening a data item specific interface of the second application, and moving the content of the first application to the second application.

In accordance with an aspect of an exemplary embodiment, an electronic device for managing operations of applications is provided. The electronic device includes: a controller coupled to the memory unit, configured: to detect a first application which is active; detect an event on the first application; and cause to display at least one action element associated with at least one non-active second application on the first application based on the event, wherein the at least one action element of the at least one second application is dynamically driven based on a context and a content of the first application.

In accordance with an aspect of an exemplary embodiment, an electronic device for managing operations of applications is provided. The electronic device includes: a controller, coupled to the memory unit, configured: detect a first application which is active; detect at least one non-active second application related to the first application through an event; and cause to display at least one action element on the first application, wherein in response to a user input on the action element, a content interaction is performed linking the first and the second application.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1A:
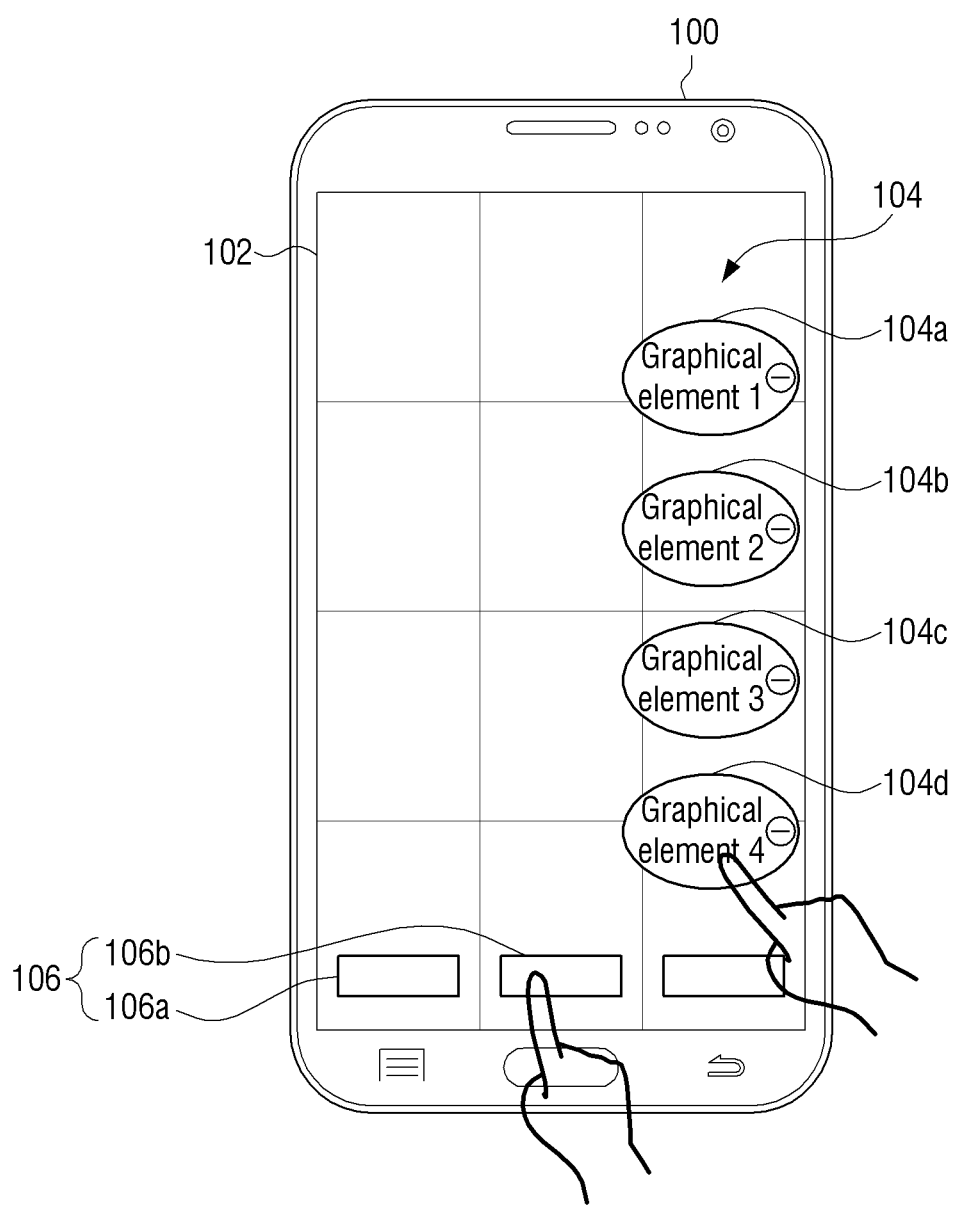
FIG. 1A illustrates an overview of an electronic device for managing operations of applications, according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The terms hereinafter are terms defined in consideration of the functions in the exemplary embodiments, and may thus vary depending on the user, operation and practice, etc. Therefore, definitions should be made based on the overall contents of the description.

Terms including numerical expressions such as a first, a second and the like may be used to explain various elements, but there is no limitation thereto. These terms are used simply for the purpose of differentiating one element from another. For example, a first element may be called a second element, and similarly, a second element may be called a first element instead. The term 'and/or' includes a combination of a plurality of related items or one of the plurality of related items.

The terms used in this description are intended for explaining the exemplary embodiments and not for limiting exemplary embodiments. A singular expression includes a plural expression unless clearly mentioned otherwise. In this description, terms such as 'include' and 'have/has' should be construed as designating that there are such characteristics, numbers, operations, elements, components or a combination thereof in the description, not to exclude the existence or possibility of adding one or more of other characteristics, numbers, operations, elements, components or a combination thereof.

Exemplary embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits or the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the exemplary embodiments may be physically separated into two or more interacting and discrete blocks without departing from the scope of exemplary embodiments. Likewise, the blocks of the exemplary embodiments may be physically combined into more complex blocks without departing from the scope of exemplary embodiments.

In exemplary embodiments, the following concepts will be used:

A first application (active): The first application may non-exclusively refer to system applications installed by the manufacturer of the electronic device and/or third party applications installed by the users of the electronic device for serving their interest. The first application herein is the active application, which a user of the electronic device is currently accessing (or, currently viewing).

A second application (non-active): The second application may non-exclusively refer to system applications installed by the manufacturer of the electronic device and/or third party applications installed by the users of the electronic device for serving their interest. The second application herein is the non-active application (i.e., non-accessed, not currently accessing, previously accessed, etc.).

A graphical user interface (GUI) elements or graphical control elements: Graphical control elements may non-exclusively refer to icons and/or symbols (or, a system icon) representing (i.e., shortcut of) the associated application, wherein the user upon pointing (long press, gesture input, or the like) on the icon, the system can navigate the user to the main window of the associated application.

An action element: The action element herein may non-exclusively refer to icon/symbol corresponding to the at least one functionality of the application (first application and second application), wherein the user upon pointing (long press, tap, etc.,) on the icon/symbol the system (or on the application) can perform the one or more actions. The action element is either the application icon or an application action icon appropriately represented. For example, camera icon, displayed within the camera application, may be configured to capture the photo (functionality). In another example, the long press by the user on at least one object within the gallery application may invoke the action element such as, for example, share, crop, tag or the like. In yet another example, the pointer on the one or more graphical elements of the second application displayed on the first application may link the first application with the second application for content interaction.

In accordance with an exemplary embodiment, a method is provided for managing operations of applications in an electronic device. The method includes detecting, by the electronic device, a first application which is active, detecting an event, causing to display at least one action element associated with at least one non-active second application on the first application, wherein the at least one action element of the at least one second application is dynamically driven based on a context and a content of the first application.

In accordance with another aspect of an exemplary embodiment, a method is provided for managing operations of applications in an electronic device. The method includes detecting a first application which is active on the electronic device, detecting at least one non-active second application related to the first application through an event, causing to display at least one action element on the first application, wherein in response to a user input on the action element, a content interaction is performed linking the first and the second application.

Unlike the related art systems and methods, one or more exemplary embodiments provide mechanisms for instant streaming of objects (for example: videos, media, content, or the like) to all relevant graphical element displayed on the first application.

Unlike the related art systems and methods, one or more exemplary embodiments provide mechanisms for instant posting of captured screenshot to all relevant graphical element associated with the second applications displayed on the first application.

Unlike the related art systems and methods, one or more exemplary embodiments provide mechanisms for instantly tagging the pictures of the pinned graphical element of the second applications (for example: pinned contacts).

Unlike the related art systems and methods, one or more exemplary embodiments provide mechanisms for searching an application contextual conversation of the pinned contacts.

Unlike the related art systems and methods, one or more exemplary embodiments may allow the user to compose an application contextual message to the pinned contacts.

Unlike the related art systems and methods, one or more exemplary embodiments may allow the user to invoke contacts' view in an application.

FIG. 1A illustrates an overview of an electronic device 100 for managing operations of applications, according to an exemplary embodiment.

Referring to FIG. 1A, the electronic device 100 may be configured to display a first application 102 (active), a second application or applications 104, and one or more action elements 106 on the first application 102. The second application 104 may include at least one among second applications 104*a*, 104*b*, 104*c*, and 104*d* displayed as graphical elements. The action elements 106 may include at least one among action elements 106*a* and 106*b* and/or at least one among second applications 104*a*, 104*b*, 104*c*, and 104*d*. The electronic device 100 may be, for example, a mobile device, a wearable device, a laptop computer, a desktop computer, a smart television, a smart display, a notebook computer, a notebook, a tablet or a mobile device such as a mobile phone. Other forms of data processing device are within the scope of the exemplary embodiments discussed herein.

The first application 102 and the second application 104 may include, for example, a camera application, a social network service (SNS), messaging application, a browser application, contacts from a contacts application, images/objects from a gallery application, or the like).

The one or more action elements 106 (hereinafter "action elements") may include, for example, graphical element corresponding to at least one functionality of the first application and/or the second application, relevant applications (i.e., second application 104) pinned on the first application 102, etc.

Figure 1B:
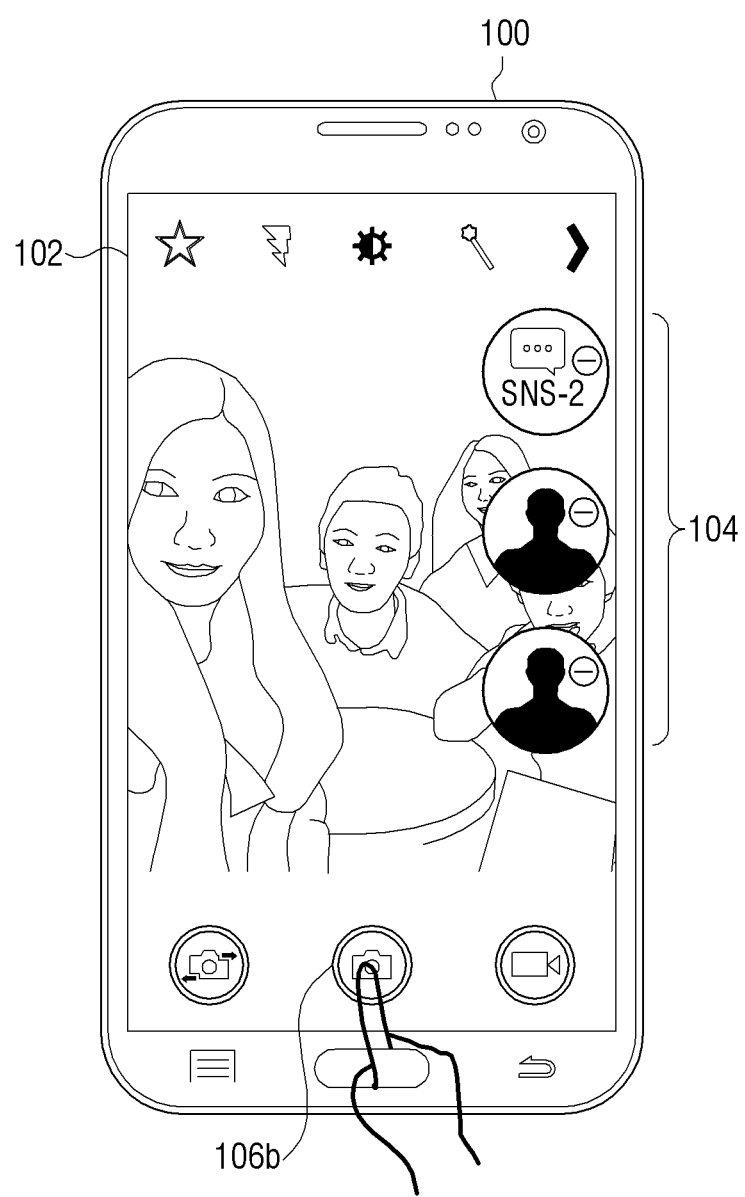
FIG. 1B is an example illustration for managing operations of applications in the electronic device, according to an exemplary embodiment.

In an example as illustrated in FIG. 1B, whenever the user of the electronic device 100 launches the camera application (i.e., the first application 102) a controller, coupled to a display, may be configured to detect and display the one or more graphical elements of the relevant applications (the second application 104, such as contacts) on the camera application. Once the controller detects the input (i.e., touch or pointer) on the action element 106, within the camera application, the controller may be configured to link the content/context of the camera application with all the relevant applications (or the selected graphical elements of the relevant applications) to perform one or more actions, such as instant sharing of the content of the camera application with the relevant contact, uploading the content of the camera application on the relevant SNS application, or the like.

Unlike the related art systems and methods, an exemplary embodiment may provide mechanisms for instant sharing of the captured pictures from the first application 102 (i.e., camera application) with all the pinned contacts.

Unlike the related art systems and methods, an exemplary embodiment may provide mechanisms for instant posting/uploading of captured pictures from the first application 102 on all the pinned relevant contacts and/or relevant applications.

Figure 2:
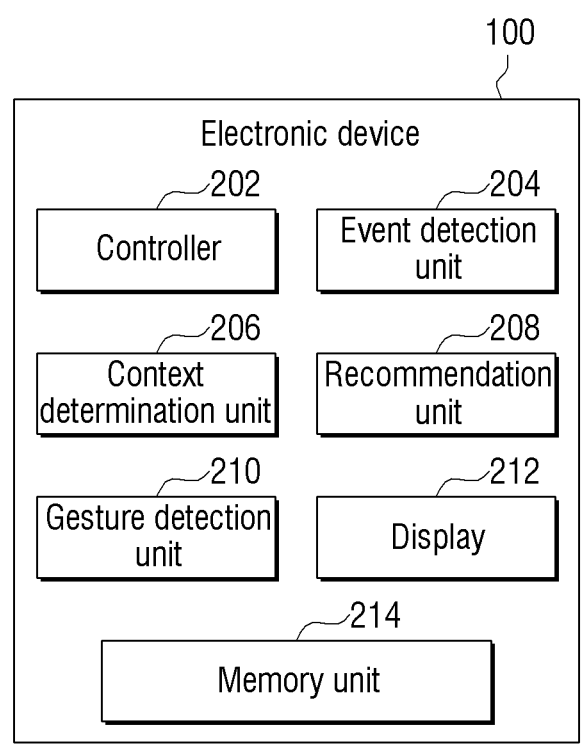
FIG. 2 illustrates an electronic device configured for managing operations of the applications, according to an exemplary embodiment.

FIG. 2 illustrates the electronic device 100 configured for managing operations of the applications, according to an exemplary embodiment.

Referring to FIG. 2, the electronic device 100 includes a controller unit, i.e., a controller 202 (for example, a processor, microprocessor, a hardware unit, an apparatus, a Central Processing Unit (CPU), a Graphics Processing Unit (GPU), etc.) communicatively coupled to a memory unit 214 (e.g., a storage, a volatile memory, and/or a non-volatile memory). The memory unit 214 may include stored thereon storage locations configured to be addressable through the controller 202. The electronic device 100 includes a display 216 (e.g., a Cathode Ray Tube (CRT) display, a Liquid Crystal Display (LCD)), a Light-emitting diode (LED), etc.). The controller 202 is configured to generate display content and/or context of the first application 102, the second application 104 and the action elements 106 to be rendered onto the display 212. Further, the electronic device 100 includes an event detection unit 204; a context determination unit 206; a recommendation unit 208 and a gesture determination unit 210. The event detection unit 204, the context determination unit 206, the recommendation unit 208 and the gesture determination unit 210 may be implemented as separate processors or as at least one processor.

The controller 202 may detect the first application 102 as active application on the electronic device 100, as for example, when the user is accessing the camera view finder in the camera application.

The event detection unit 204 may detect the event based on the context of the first application 102. For example, the event may be determined based on at least one of a frequently accessed data items, nearby data items, events associated with data items of the electronic device 100, data items recognized in the content of the first application 102 and displayed on the display 212, data items tagged in the content of the first application 102, and user favorite data items.

The controller 202 may cause to display, through the display 212, at least one action element 106 associated with at least one non-active second application 104 on the first application 102, wherein the at least one action element of the at least one second application 104 is dynamically driven based on a context and a content of the first application 102. For example, if the user had previously shared the content and/or context of the camera view finder with the contact-A, the controller 202 may be configured to display the contact-A whenever the user launches the camera view finder in the camera application.

In the above example, the context determination unit 206 may detect the context of the first application 102, and the recommendation unit 208 may recommend the one or more relevant graphical elements (i.e., action element 106) of the second application 104 based on the user input provided by the context determination unit 206. The recommendation unit 208 may also be coupled to the event detection unit 204 to provide the recommendation based on the event.

In another exemplary embodiment, the controller 202 may detect at least the one non-active second application 104 related to the first application 102 through the event.

The controller 202 may cause to display at least one action element on the first application, wherein in response to a user input on the action element, a content interaction is performed linking the first application 102 and the second application 104. For example, the user input on the camera application (displayed), tapping on the image capture icon (or tapping on one or more graphical elements of the second application) may instantly share the captured object of the camera view finder with the second application 104 displayed on the first application 102.

The user input may include, for example, touch input, a tap input, a force touch input, a drag input and a long press input.

The content interaction may include at least one of sharing the content of the first application 102 with at least one second application 104, searching for a data item associated with the second application 104 in the content of the first application 102, adding the data item associated with the second application 104 in the first application 102, creating another event associated with the first application 102 based on the data item associated with the second application 104, opening the data item specific interface of the second application 104, and moving the content of the first application 102 to the second application 104.

While FIG. 2 illustrates certain units of the electronic device 100, the present invention is not limited thereto. For example, the electronic device 100 may include fewer or more units. Additionally, the labels and/or names of the units of the electronic device 100 are provided only for illustrative purpose and do not limit the scope of the exemplary embodiments. For example, one or more units may be combined together to perform same or substantially similar function.

Figure 3:
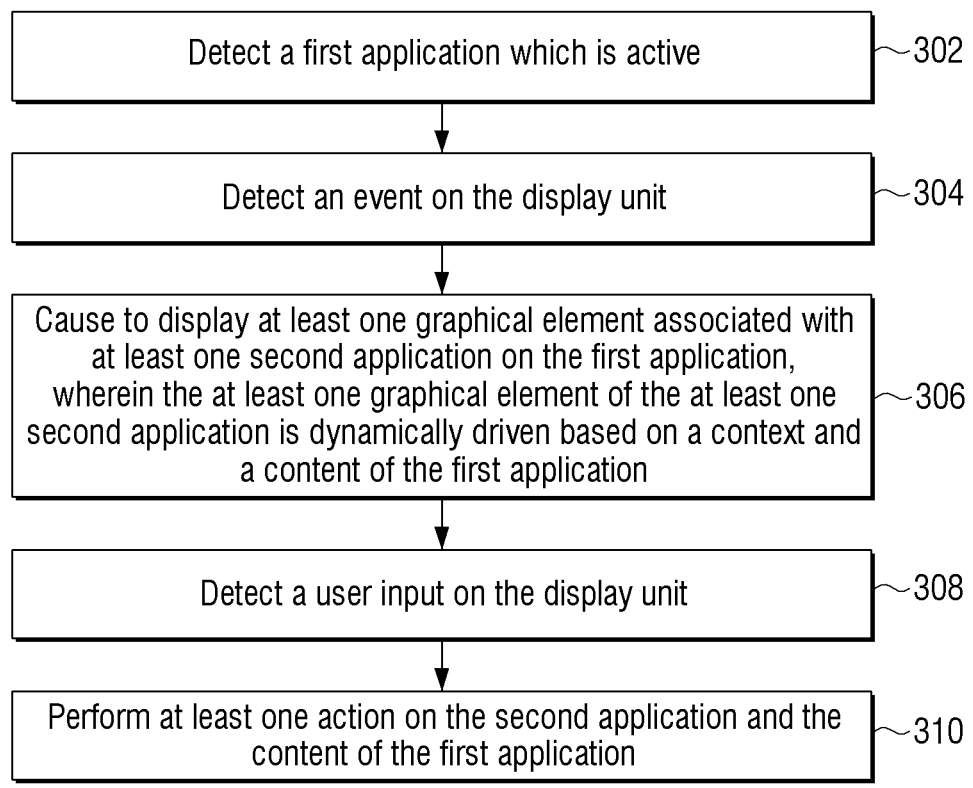
FIG. 3 is a flow diagram illustrating a method for managing the operation of the applications of the electronic device, according to an exemplary embodiment.

FIG. 3 is a flow diagram illustrating a method for managing the operation of the applications of the electronic device 100, according to an exemplary embodiment.

Referring to FIG. 3, in operation 302, the electronic device 100 detects that the first application 102 is active. Once the controller 202 detects that the first application 102 is active, in operation 304, the electronic device 100 detects the event on the display 212. For example, in the electronic device 100 as illustrated in FIG. 2, the event detection unit 204 detects the event on the display 212 (for example, display 212 rendering the first application 102).

Based on the event, the electronic device 100, in operation 306, causes to display the at least one action element 106 associated with the at least one non-active second application 104 on the first application 102. For example, in the electronic device 100 as illustrated in FIG. 2, the controller 202 causes to display the at least one action element 106 associated with the at least one non-active second application 104 on the first application 102, wherein the at least one action element 106 of the at least one second application 104 is dynamically driven based on a context and a content of the first application 102.

Further, the electronic device 100, in operation 308 detects the user input on the display 212. For example, in the electronic device 100 as illustrated in FIG. 2, the gesture detection unit (or a touch sensor) 210 detects the user input on the display 212. The user input may be, for example, the touch, the tap, the force touch, the touch and drag, the long press, etc.

Based on the user input, the electronic device 100, in operation 310, may perform the at least one action on the second application 104 and the content of the first application 102. For example, the controller 202 coupled to the recommendation unit 208 performs the at least one action on the second application 104 and the content of the first application 102.

For example, if the event detection unit 204 detects the user input on the graphical element 1 and the graphical element 2 as illustrated in FIG. 1A, the controller 202 therefore may perform the at least one action with the user input on the graphical element 1 and the graphical element 2 only (but not on the other graphical elements).

The various actions, acts, blocks, steps, etc., as illustrated in FIG. 3 may be performed in the order presented, in a different order, or simultaneously. Further, in some exemplary embodiments, some of the actions, acts, blocks, steps, etc., may be omitted, added, modified, skipped, etc., without departing from an exemplary embodiment.

Figure 4:
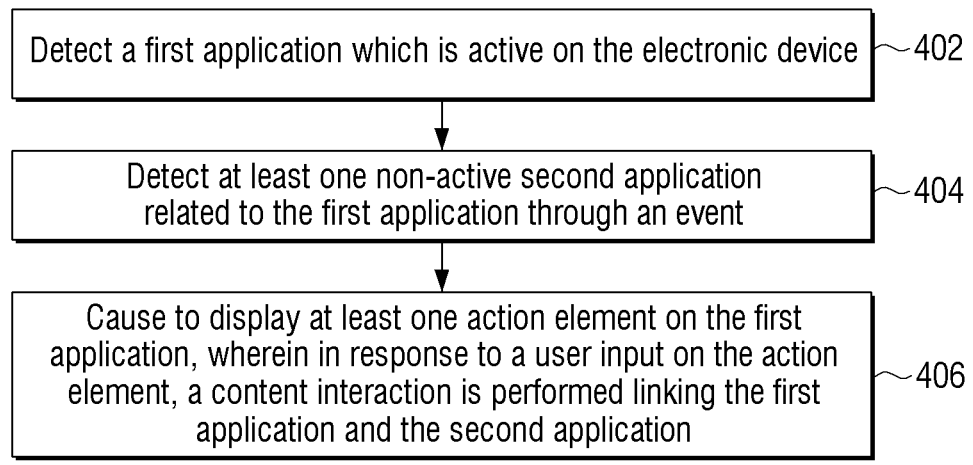
FIG. 4 is another flow diagram illustrating a method for managing the operation of the applications of an electronic device, according to an exemplary embodiment.

FIG. 4 is another flow diagram illustrating a method for managing the operation of the applications of the electronic device 100, according to an exemplary embodiment.

Referring to FIG. 4, in operation 402, the electronic device 100 detects that the first application 102 is active. In operation 404, the electronic device 100 may detect the at least one non-active second application 104 related to the first application through the event. Based on the event, the electronic device 100, in operation 406, may cause to display the at least one action element on the first application 102, wherein in response to the user input on the action element, the content interaction is performed linking the first application 102 and the second application 104.

The various actions, acts, blocks, steps, etc., as illustrated in FIG. 4 may be performed in the order presented, in a different order, or simultaneously. Further, in some exemplary embodiments, some of the actions, acts, blocks, steps, etc., may be omitted, added, modified, skipped, etc., without departing from the scope of exemplary embodiments.

FIGS. 5A-5D show an example illustration for managing the operations of the camera application 500 of the electronic device, according to an exemplary embodiment.

Figure 5A:
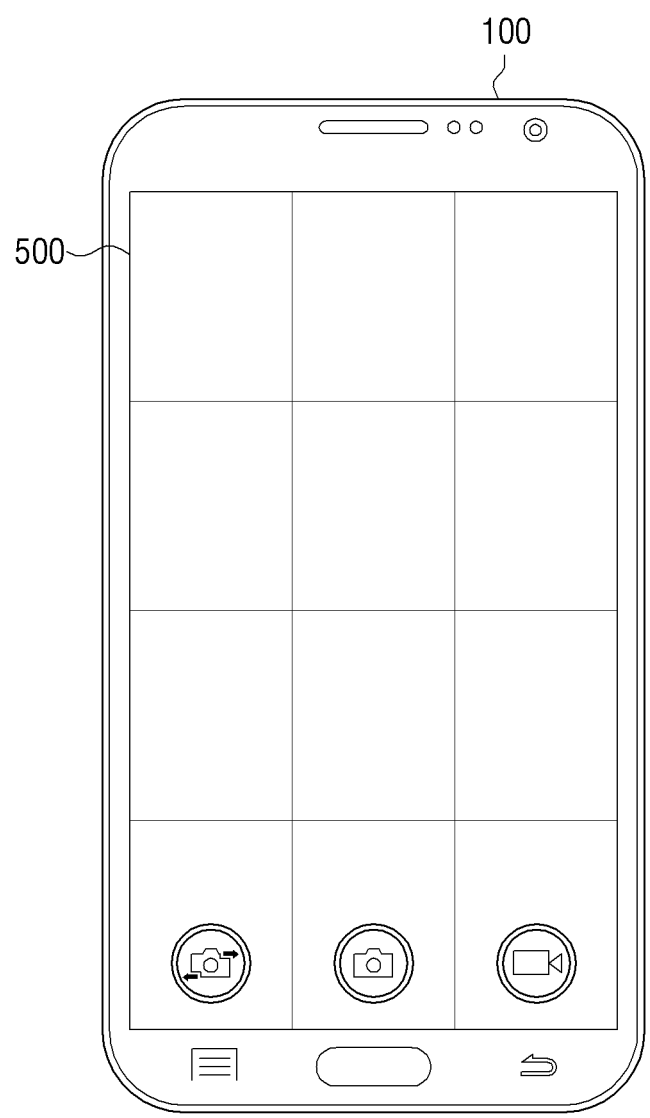
FIGS. 5A, 5B, 5C, and 5D are examples of managing the operations of the camera application of an electronic device, according to an exemplary embodiment.
Figure 5B:
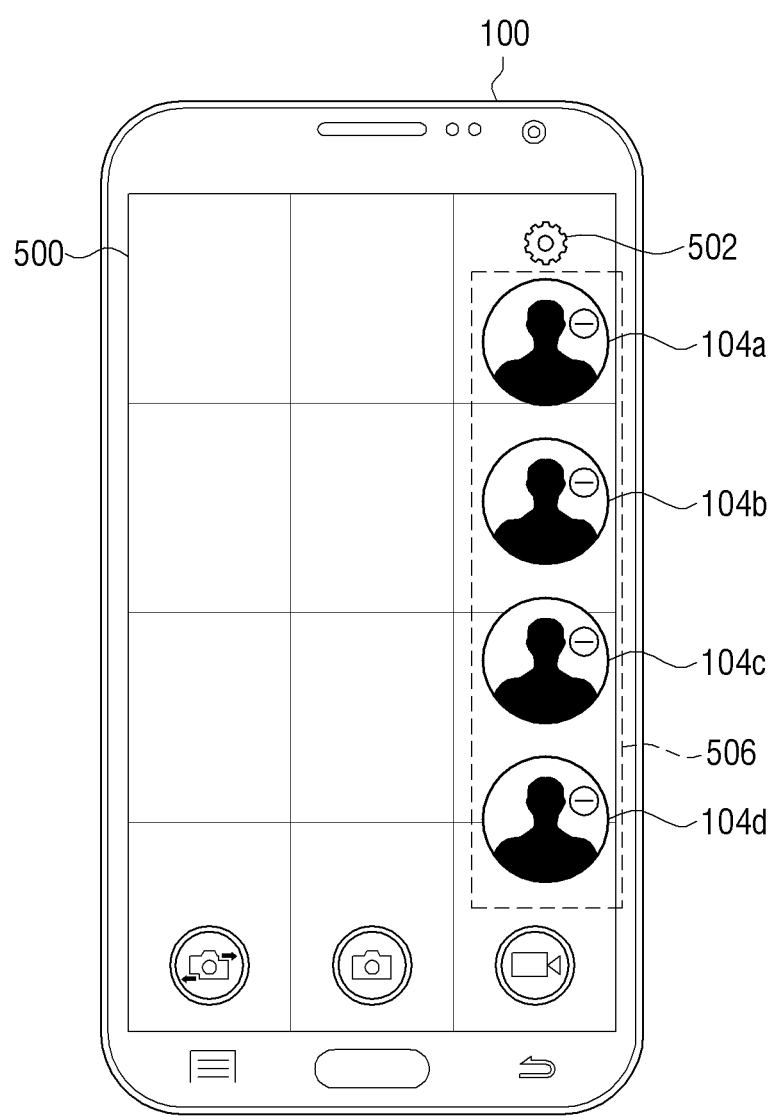

Referring to FIG. 5A, once the controller 202 detects that the camera application 500 is active i.e., user accessing/accessed to capture/record the object (image, picture, etc.). While the camera application 500 is active, the controller 202 may detect the user input on the camera application 500 and may launch communication application 506 on the camera application 500, as illustrated in FIG. 5B. The communication application 506 on the camera application 500 displays the contact icons, e.g., a list of contacts whom user usually accesses from camera application 500 while sharing and/or streaming the objects.

The communication application 506 may allow for quick access of the applications and/or contacts and may be displayed on the area of the display 212 and/or along any portion of the screen of the display 212 of the electronic device 100 where contact icons (i.e., pinned) are displayed. The communication application 506 may be launched by utilizing a button 502 (i.e., pointer, logical button, edge handler, etc.) on the electronic device 100. The context determination unit 206 may detect the current context (for example: the camera view finder) and provide the input to the recommendation unit 208, coupled to controller 202, to recommend relevant contacts. The display 212 may display the relevant contacts on the communication application 506, as for example, the contact may be pushed from the communication application 506 onto the camera application 500 to pin the contact(s) to the camera view finder for instant sharing of the objects based on a user input 504 (i.e., force touch) on the particular pinned contact(s).

In an example, the rules for deriving application context and contacts suggestion, as illustrated in FIG. 5B, may include: contacts that user shares frequently from current application, contacts whose address (in contacts application and/or the SNS application) is near current location, contacts with recent check-in information of nearby location (in third party applications), contacts recently contacted through core/third party applications (call, text, chat, like, etc.), contacts with birthday/anniversary information today/upcoming synced with planner application, contacts who are recognized or tagged on currently view photo/video of the camera application 500, contacts whose wish-list in third party e-commerce application matches currently viewed product/object, contacts part of an ongoing/upcoming event common to user, contacts from a recently passed event, contacts from an event of similar taste to user's recent/ongoing/upcoming events, contacts usually contacted on this day/weekdays/weekends, contacts usually contacted at this time of day/night, favorite contacts who have not been contacted in a while (threshold of time may be defined), parsing based contact suggestion (current context may be parsed to match contact name or field in contacts database) and contacts whose call was recently missed (recently missed with a message may be prioritized).

Figure 5C:
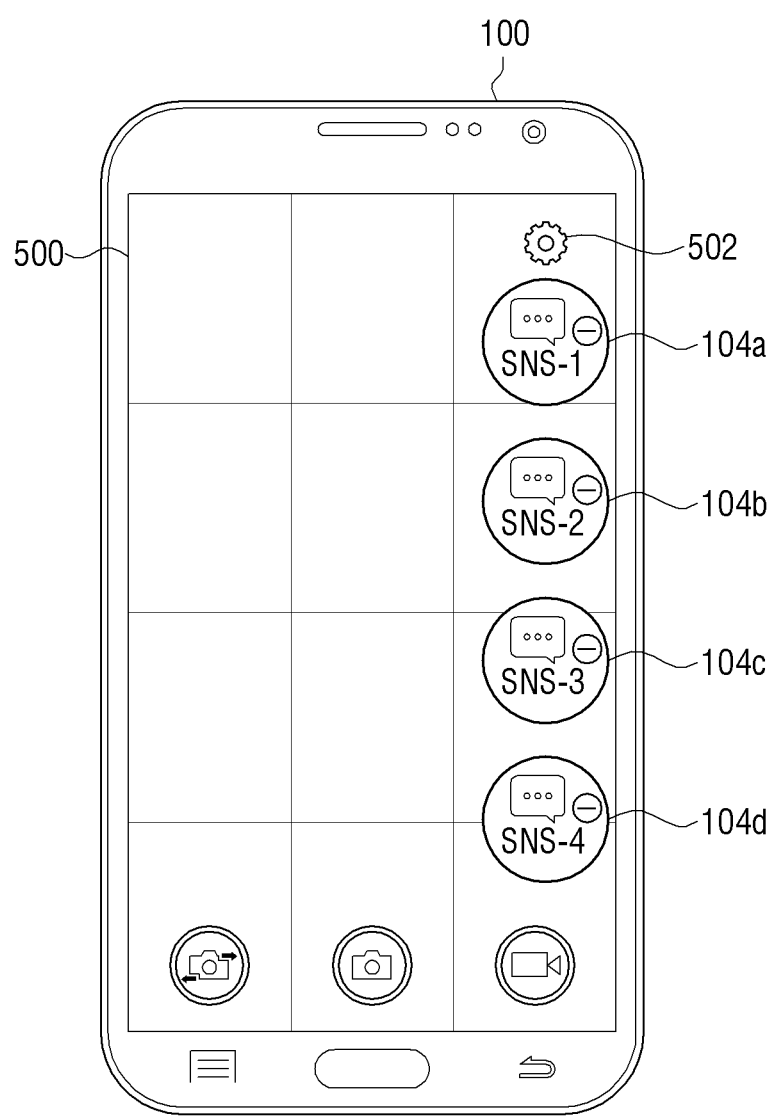

The context determination unit 206 may detect the current context (for example: the camera view finder) and provide the input to the recommendation unit 208, coupled to controller 202, to recommend the relevant SNS applications based on the event (i.e., based on the aforementioned rules). The display 212 may display the relevant SNS applications on the communication application. This is based on patterns understanding (i.e., event; user usually/often posting content on these SNS applications from the given application context), as illustrated in FIG. 5C. The communication application is an area on the display 212 along any edge where application icons are displayed.

In an example, the rules deriving the application context and application suggestion, as illustrated in FIG. 5C, includes application that user posts frequently from current application (i.e., camera application 500), application user usually posts while in/near current location, application with user's/user's contacts' recent check-in info (3rd party applications), the recent SNS applications used to contact people (call, text, chat, like, etc.), applications with birthday/anniversary information of contacts today/upcoming synced with S-Planner, application with contacts information of an ongoing/upcoming event common to the user, application with contacts information of a recently passed event, applications with contacts information of another event of similar taste to user's recent/ongoing/upcoming events, applications usually posted on this day/weekdays/weekends, applications usually posted on at this time of day/night, application names parsed from current context, applications used by user to recently for posting content or communication.

The gesture detection unit 210 may detect the user input (for example: force touch) on the action element 106 i.e., on the graphical element of the contacts/applications (second application 104) pinned on the first application 102. Further, the gesture detection unit 210 may detect the user input 504 on the action element 106 i.e., graphical element of the video recording functionality of the camera application 500. Thus, the video recorded may be shared with the action element 106 (or on selected contact/selected applications) based on the user input 504 as illustrated in FIG. 5D.

Figure 5D:
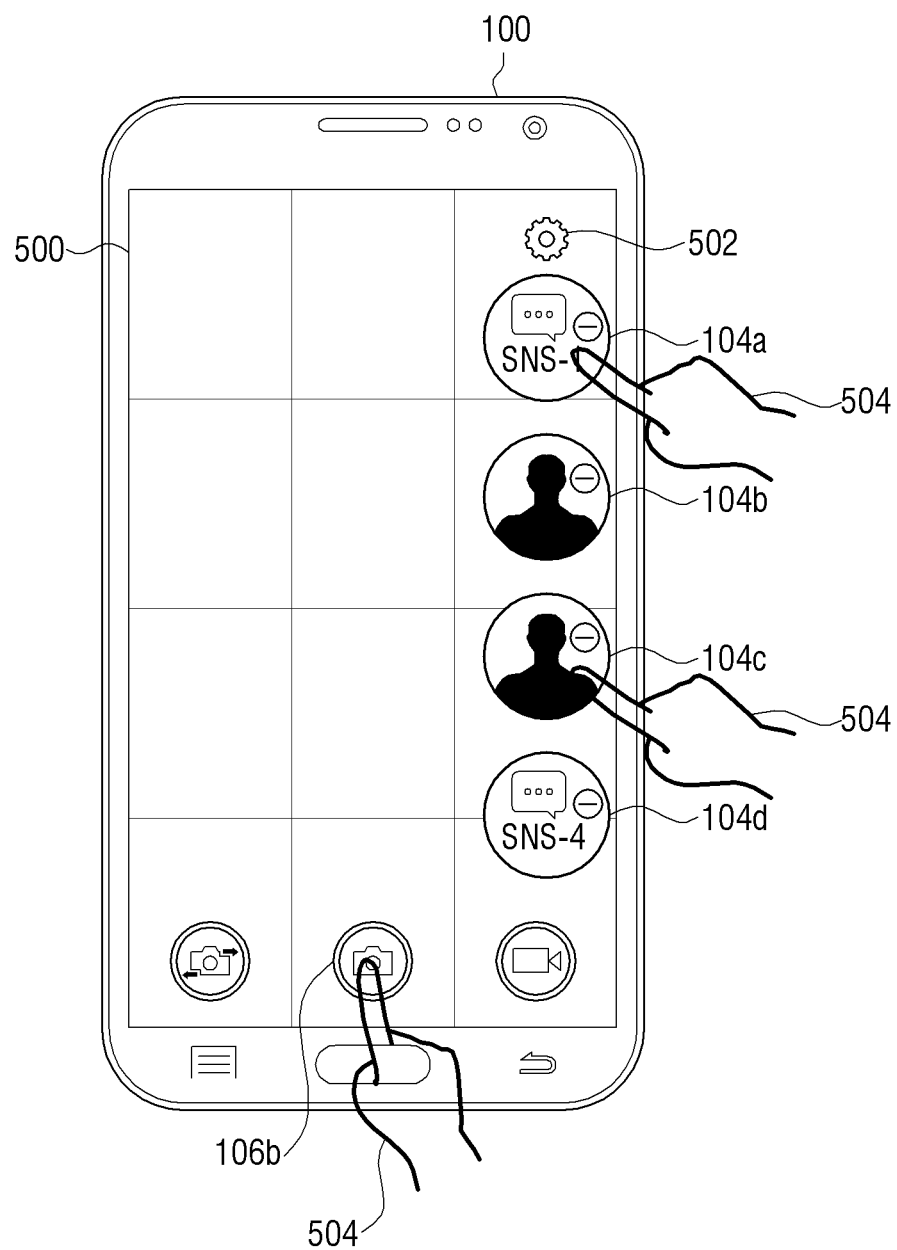

The gesture detection unit 210 may detect the user input 504 on the desired pinned contact icon for sharing the objects with the desired contacts and/or on the desired applications as illustrated in FIG. 5D.

Figure 6A:
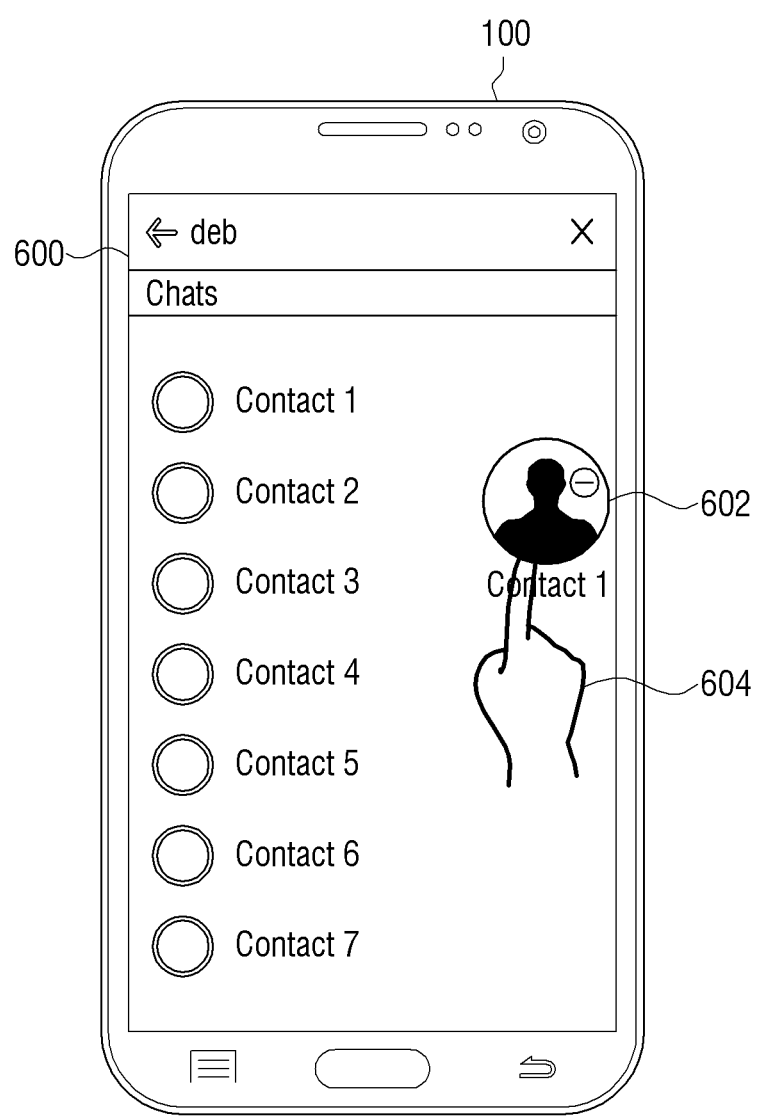
FIGS. 6A and 6B are examples of managing the operations of the SNS application, according to an exemplary embodiment.
Figure 6B:
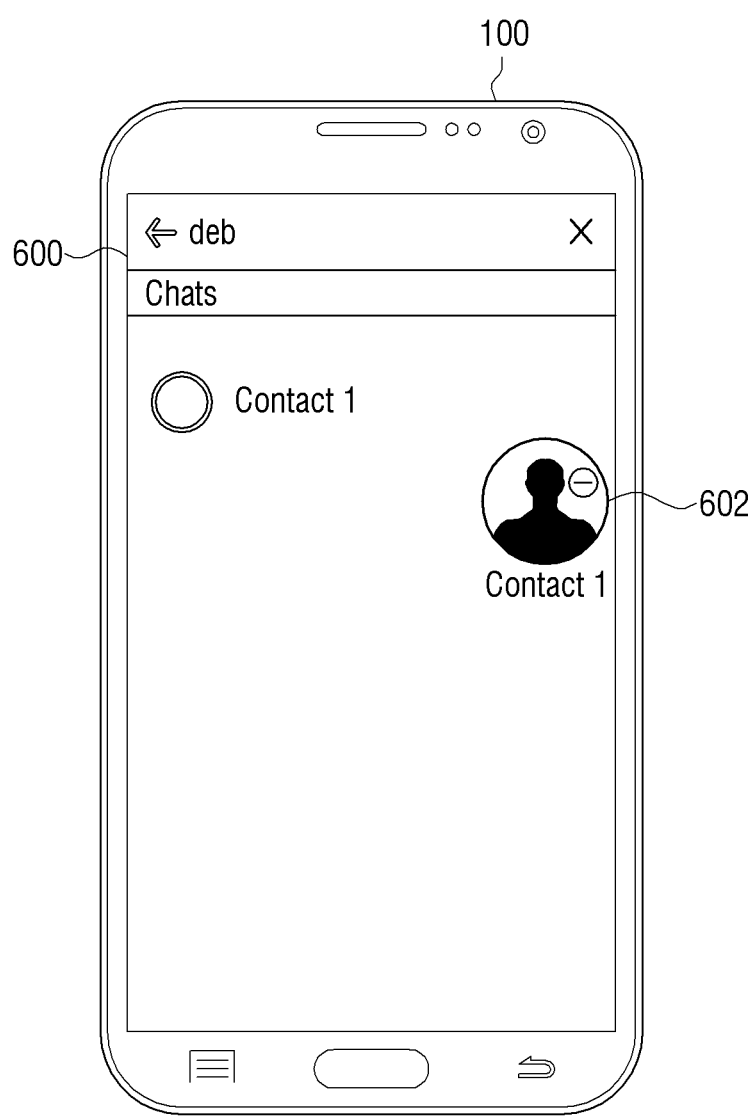

FIGS. 6A and 6B show an example illustration for managing the operations of the SNS application 600, according to an exemplary embodiment.

Referring to FIG. 6A, the context determination unit 206 may determine the context of the SNS application 600 (SNS-1) and based on the at least one event (i.e., based on the aforementioned rules for deriving the relevant application), detected by the event detection unit 204, the controller 202 may cause to display an action element 602 (relevant contact-1, pinned) on the SNS application 600. Once the gesture detection unit 210 detects a user input 604 (i.e., long press, drag interaction, tap interaction, etc.) on the action element 602, the controller 202 may perform the content interaction by linking the action element 602 with the SNS application 600.

The content interaction: the controller 202 may retrieve and display conversation pertaining to the contact-1 or text with contact name (of contact-1) within conversations in the SNS application 600, as illustrated in FIG. 6B.

Figure 7A:
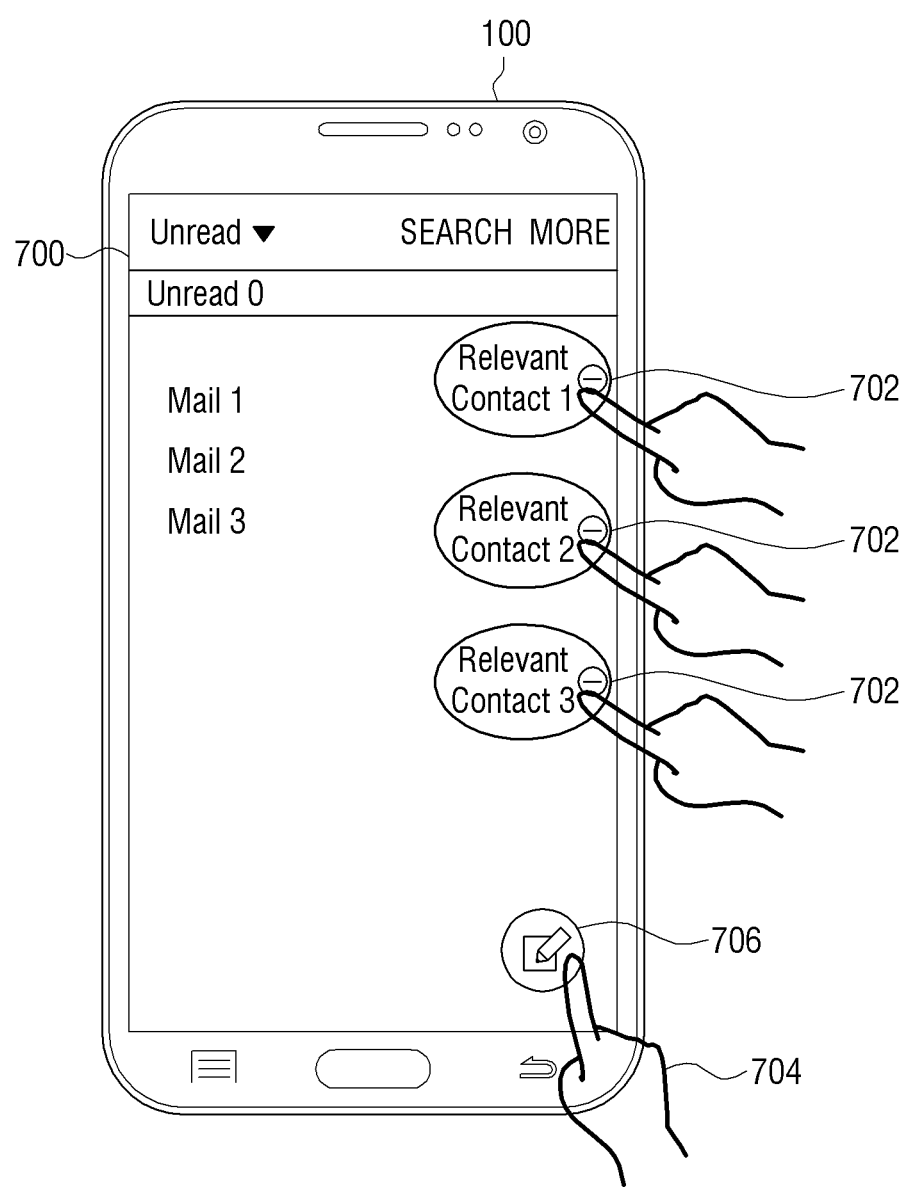
FIGS. 7A and 7B are examples of managing the operations of the SNS application of an electronic device, according to an exemplary embodiment.
Figure 7B:
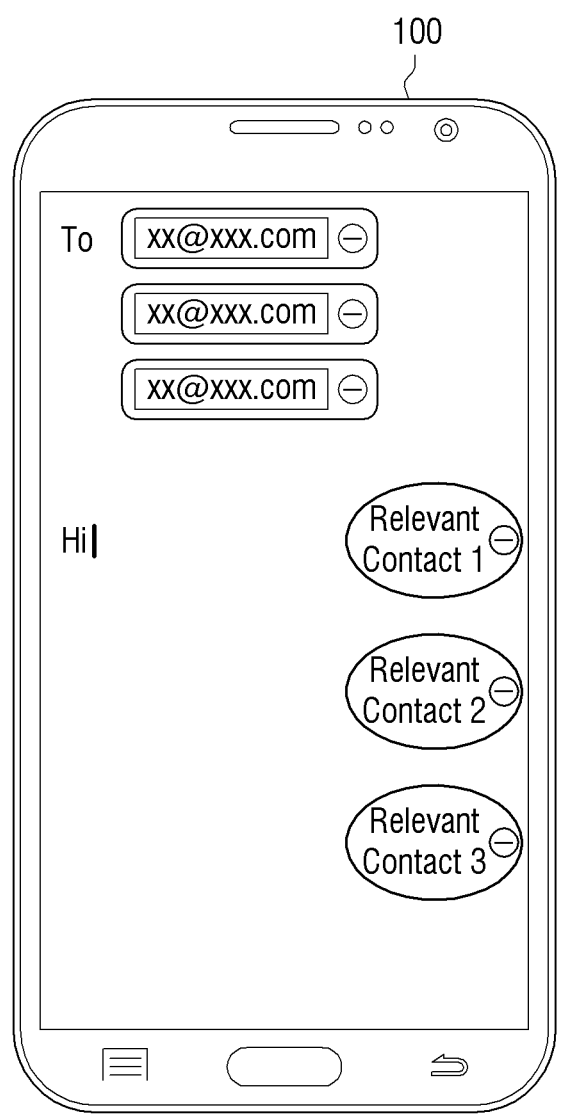

FIGS. 7A and 7B illustrate another example of a method for managing the operations of the SNS application 700, according to an exemplary embodiment.

Referring to FIG. 7A, the context determination unit 206 may determine the context of the SNS application 700 (i.e., Email application) and based on the at least one event, detected by the event detection unit 204, the controller 202 may cause to display at least one action element 702 (relevant contact, pinned) on the SNS application 700. Once the gesture detection unit 210 detects a user input 704 (i.e., long press, drag interaction, tap interaction, etc.) on the at least one action element 702 and the user input 704 on an action element 706 of the SNS application 700, the controller 202 may perform the content interaction by linking the at least one action element 702 with the SNS application 700.

The content interaction: the controller 202 may compose an email, by automatically retrieving the email addresses of the contacts pertaining to the pinned contacts (contact-1, contact-2, contact-3), within conversations in the SNS application 700, as illustrated in FIG. 7B.

In an exemplary embodiment, the 3D-touch on the private/favorite contact (action element 702) in a content list view in the SNS application 700 to open contact's emails securely (biometric of finger used to 3D-touch). The emails that are secured by user to open using this security enabled method is only displayed on the display 212.

In case of such security enabled content specific to contact, the user input on the private/favorite contact might not search for the content, and indicates the controller 202 that the SNS application 700 is security enabled.

The user input on action element (i.e., of the contact) in a content list view in the SNS application 700 to open contact's emails securely (biometric of finger used to 3D-touch). The chat content that are secured by user to open using this security enabled method is only displayed on the display 212.

In yet another example, the user input 704 on the action element contact 702 is used in a multiplayer gaming scene to open peek view of contact's scene and game status temporarily. The gesture detection unit 210 detects that the user input is released the scene changes back to user's own game scene, contact's game view on user's display 212.

FIGS. 8A-8D show an example illustration for managing a favorite/private contact icons from a home screen/application tray of the electronic device 100, according to an exemplary embodiment.

Figure 8A:
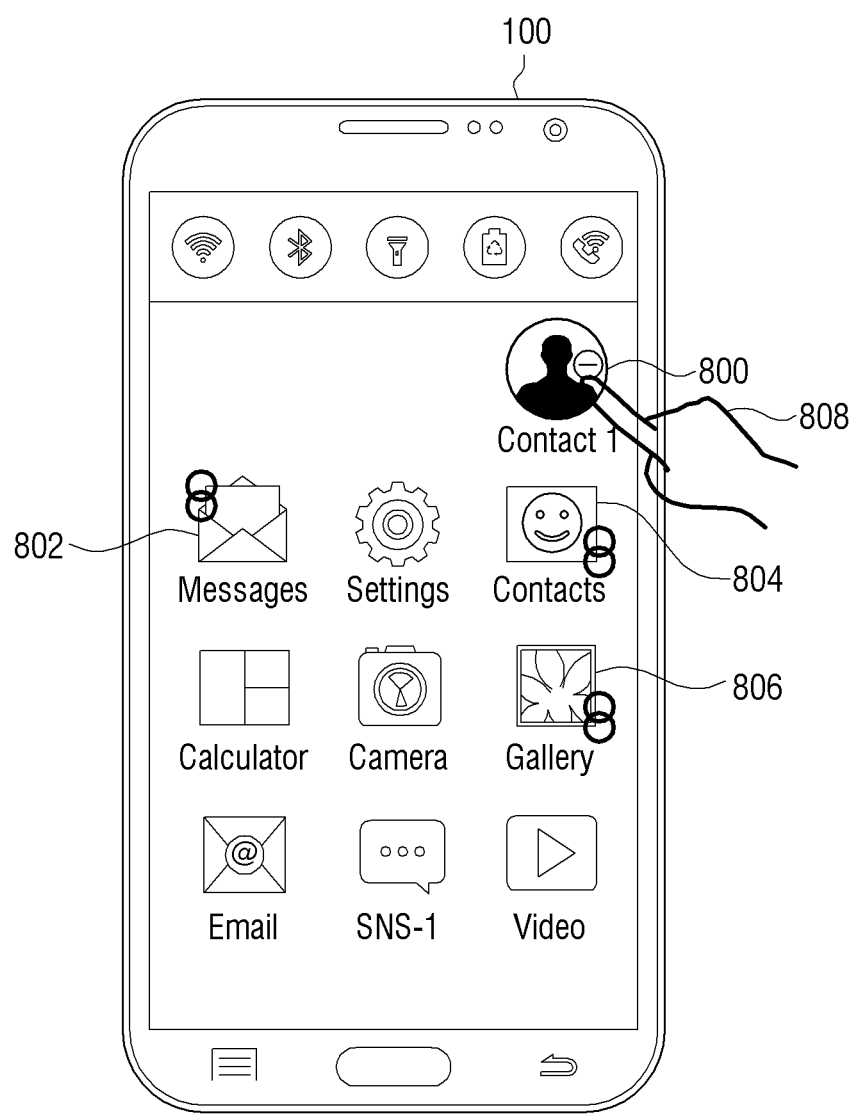
FIGS. 8A, 8B, 8C, and 8D are examples of managing a favorite/private contact icons, according to an exemplary embodiment.

Referring to FIG. 8A, the user can drag the private/special icon 800 (i.e., action element) onto the one or more application icons present in the display 212. The one or more application icons may be messaging application 802, contacts application 804 and a gallery application 806. The gesture detection unit 210 detects an user input 808 on the private/special icon 800 and drags onto the messaging application 802, as illustrated in FIG. 8B.

Figure 8B:
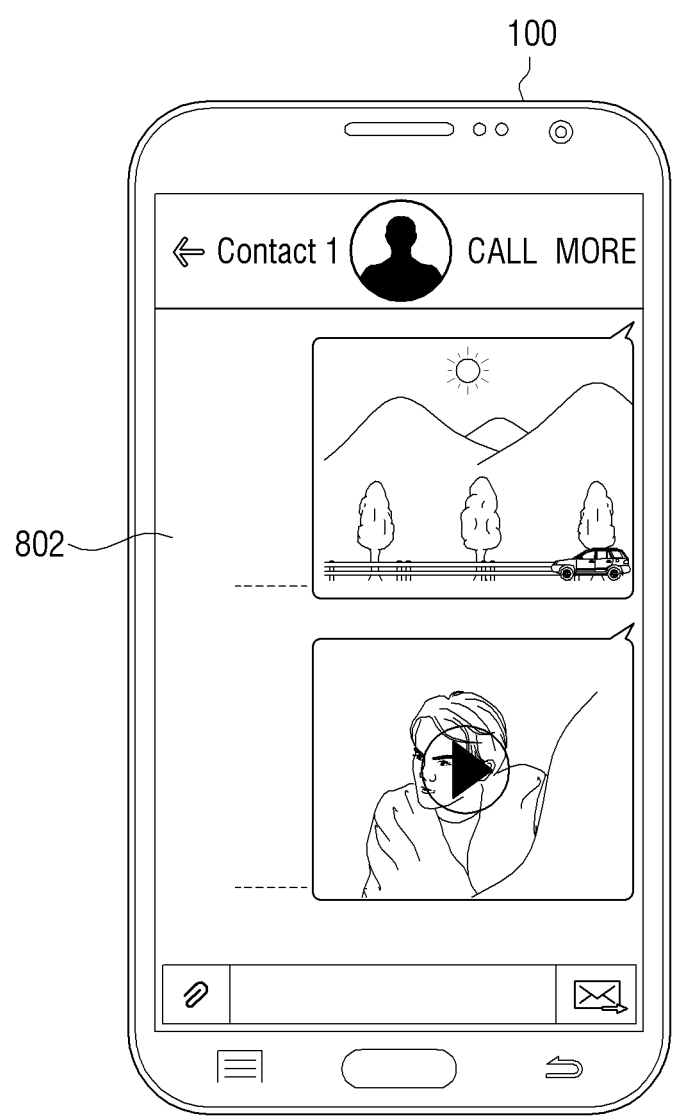

Referring to FIG. 8B, the controller 202 may launch all the conversation related to the contact-1 (i.e., private/special icon 800) available in the messaging application 802.

Figure 8C:
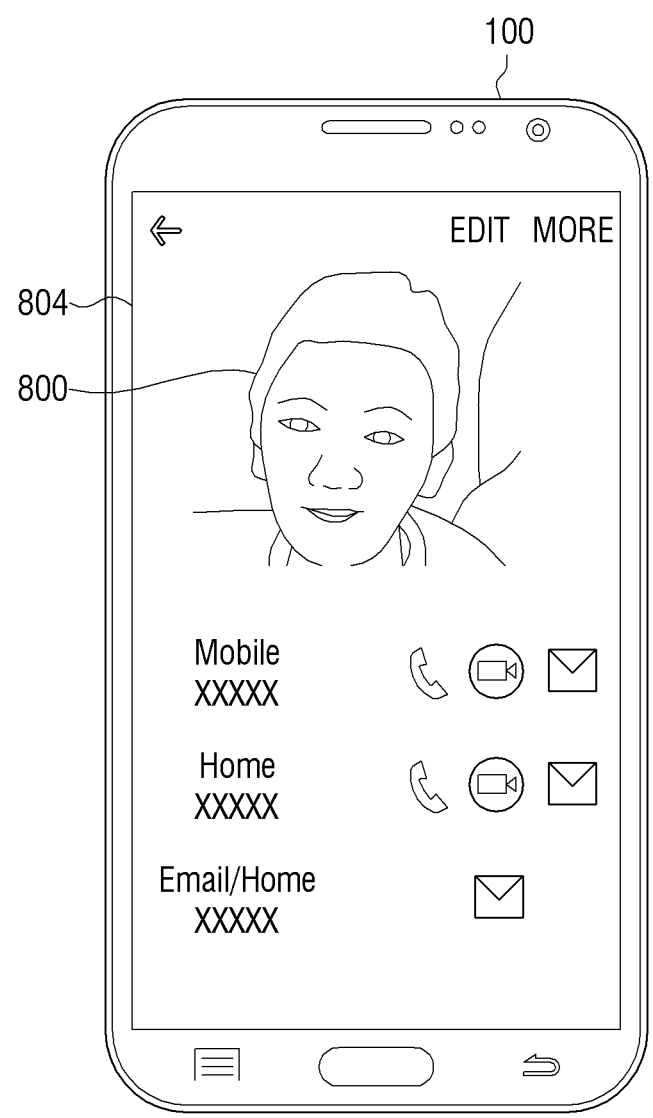

Furthermore, the gesture detection unit 210 detects the user input 808 on the private/special icon 800 and drags onto the contacts application 804, as illustrated in FIG. 8C.

Referring to FIG. 8C, the controller 202 may explore all the contacts available in the contacts application 804 to identify the matching contact pertaining to the contact-1 (i.e., private/special icon 800) based on the user input 808. If the match is detected, the display 212 may display the contact details of the contact-1.

Figure 8D:
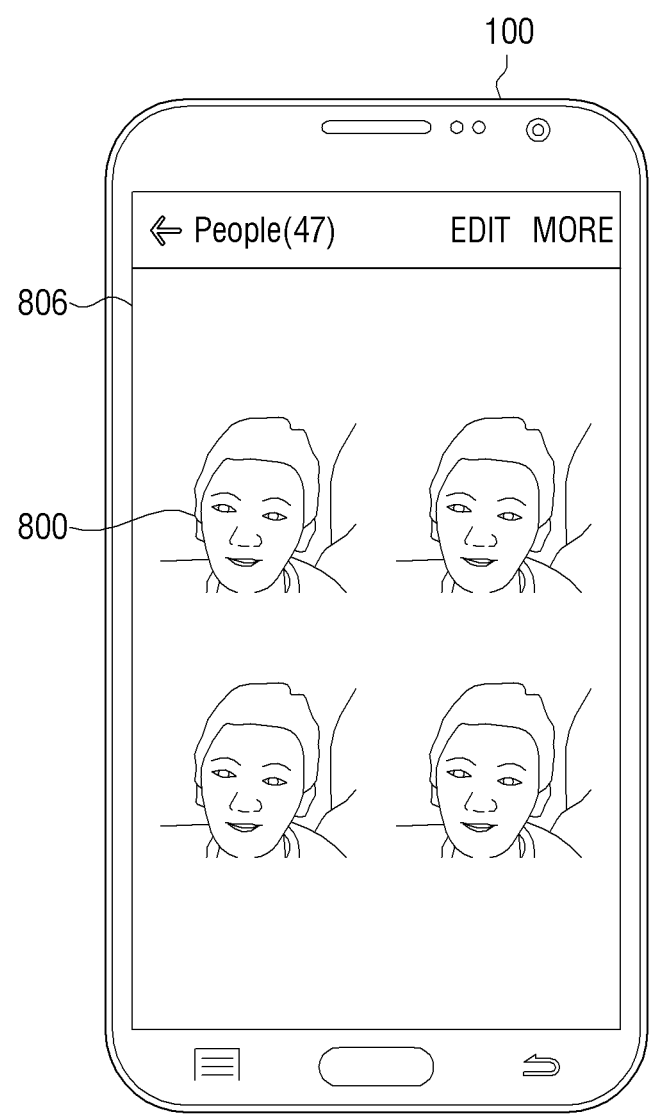

Further, the gesture detection unit 210 detects the user input 808 on the private/special icon 800 and drags onto the gallery application 806, as illustrated in FIG. 8D.

Referring to FIG. 8D, the controller 202 may explore all the objects within the gallery application 806 to identify the matching object pertaining to the contact-1 (i.e., private/special icon 800) based on the user input 808. If the match is detected the display 212 may display all available objects of the contact-1.

Figure 9A:
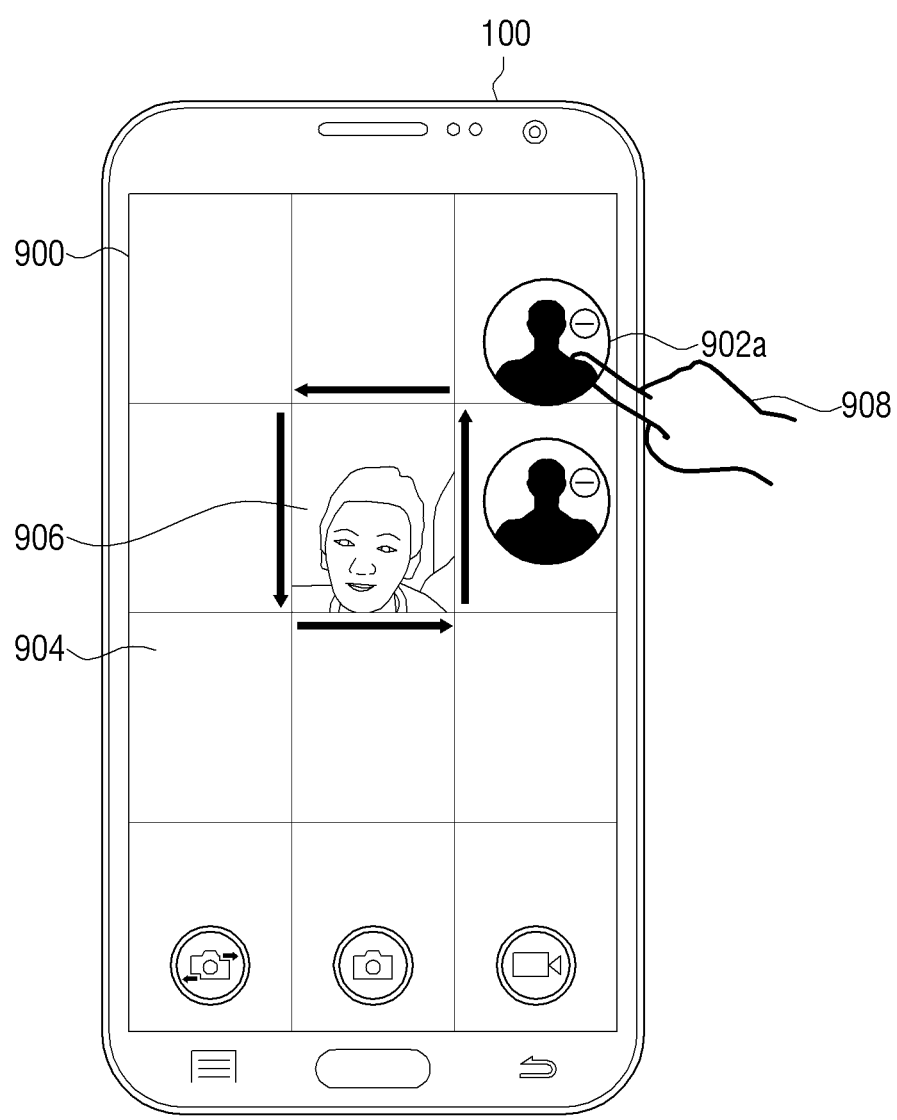
FIGS. 9A and 9B are examples of managing the operations of the camera application of an electronic device, according to an exemplary embodiment.
Figure 9B:
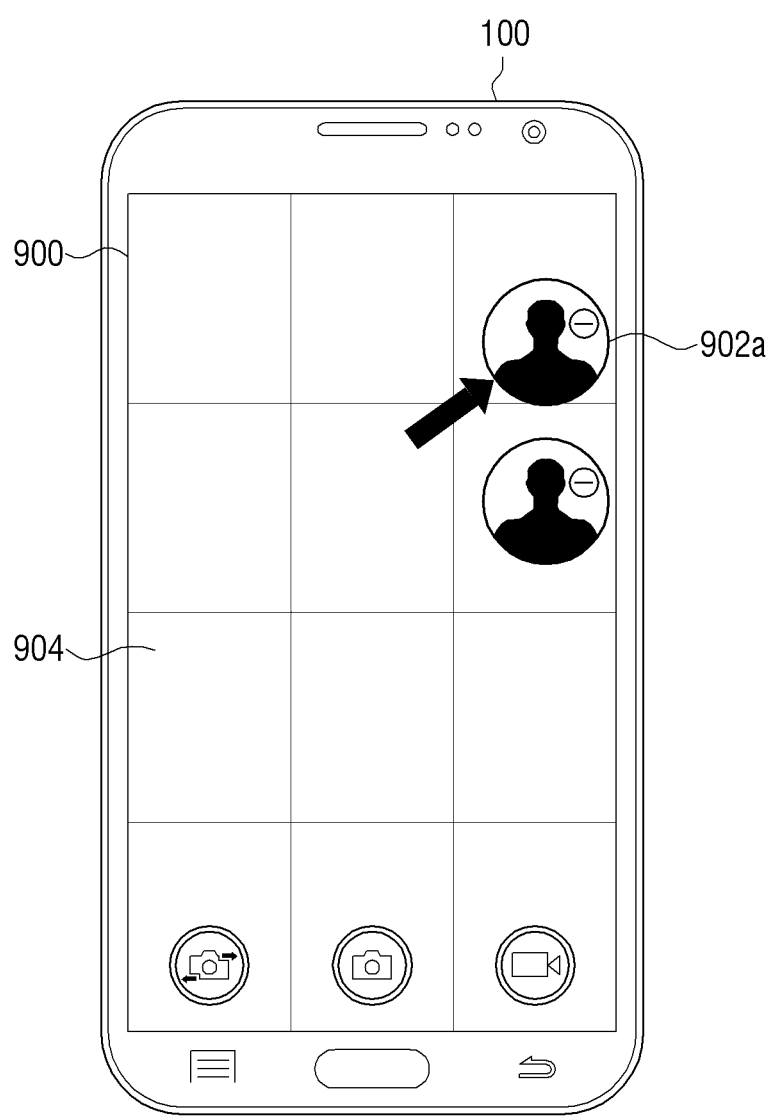

FIGS. 9A and 9B illustrate managing the operations of the camera application 900 in the electronic device 100, according to an exemplary embodiment.

Referring to FIGS. 9A and 9B, the gesture detection unit 210 may detect the user input 908 (i.e., dragging gesture) on the pinned action element 902a (contact-1). The gesture detection unit 210 may detect the dragging gesture performed by the user on the camera application 900 (i.e., camera view finder 904) to capture, by dragging the action element (icon) 902a, the object 906 (i.e., image) across a portion of the display 212 to draw a closed shape on the object 906. Thus, the drawn closed shape (shapes for example, rectangular, circle, etc.) is shared with the action element 902a.

In an exemplary embodiment, a similar gesture pattern is detected by the gesture detection unit 210 across an object present in the first application 102. The controller 202 may perform the one or more actions based on the gesture pattern detected by the gesture detection unit 210. The action such as capturing screen shot by dragging the action element 106 across the object may share the selected pattern of the object with the application (such as the SNS application) corresponding to that of the action element 106.

Figure 10A:
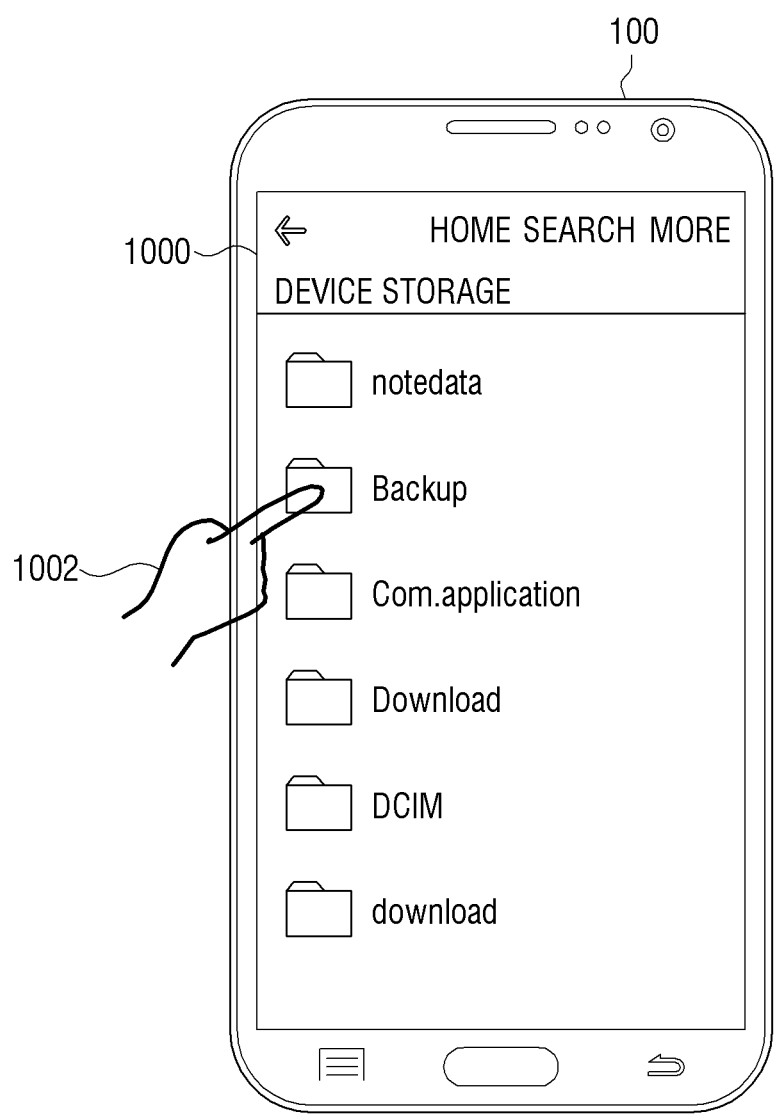
FIGS. 10A, 10B, and 10C are examples of managing the operations of the storage folder in accordance with the gallery application of an electronic device, according to an exemplary embodiment.
Figure 10B:
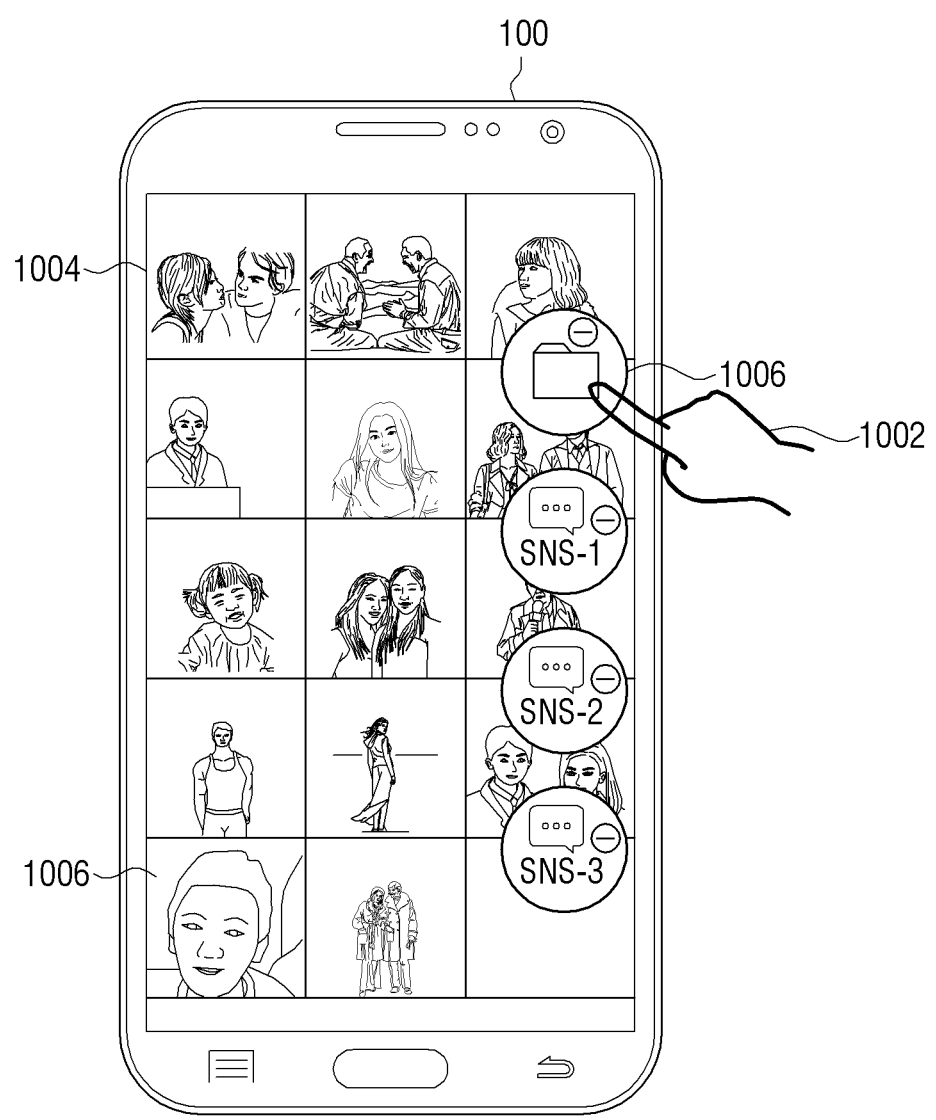
Figure 10C:
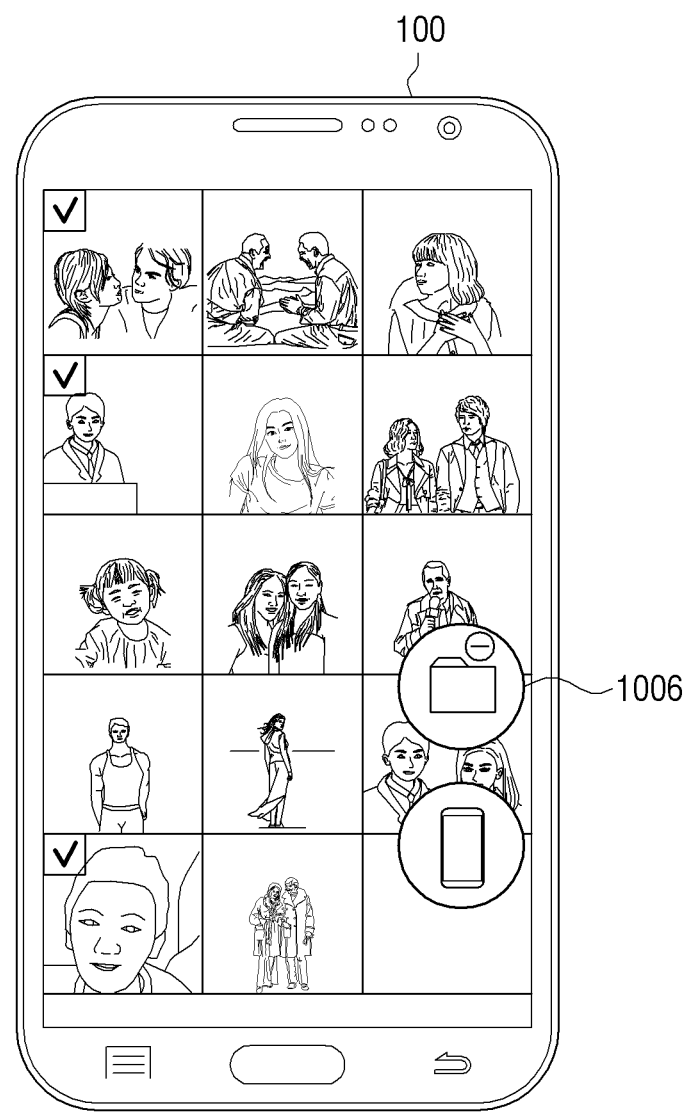

FIGS. 10A-10C show an example illustration for managing the operations of the My Files application 1000 in accordance with the gallery application in the electronic device 100, according to an exemplary embodiment.

Referring to the FIGS. 10A-10C, the gesture detection unit 210 may detect the user input 1002 on a desired folder in My Files application 1000 to bring it to communication application(s) 1004 (as shown in FIG. 10B). The user input 1002 on the communication application(s) 1004 may be received to create private/favorite icon 1006 (i.e., action element) on the application context (ex. Gallery photos). The folder 1006 may perform like a move-over bucket. Any selected content on page (as shown in FIG. 10C) may be moved over to this folder 1006 inside the My Files application 1000. Content moved to desired folder 1004 may create copies and the originals remain in the starting location.

In an exemplary embodiment, similar operations may be performed where the private/favorite folder icon 1006 is created in the Email application. The Email content may be moved over to the folder 1006 inside My Files application 1000. The private/favorite folder icon 1006 may be created in messages application. The message content may be moved over to the folder 1006 inside My Files application 1000.

Figure 11A:
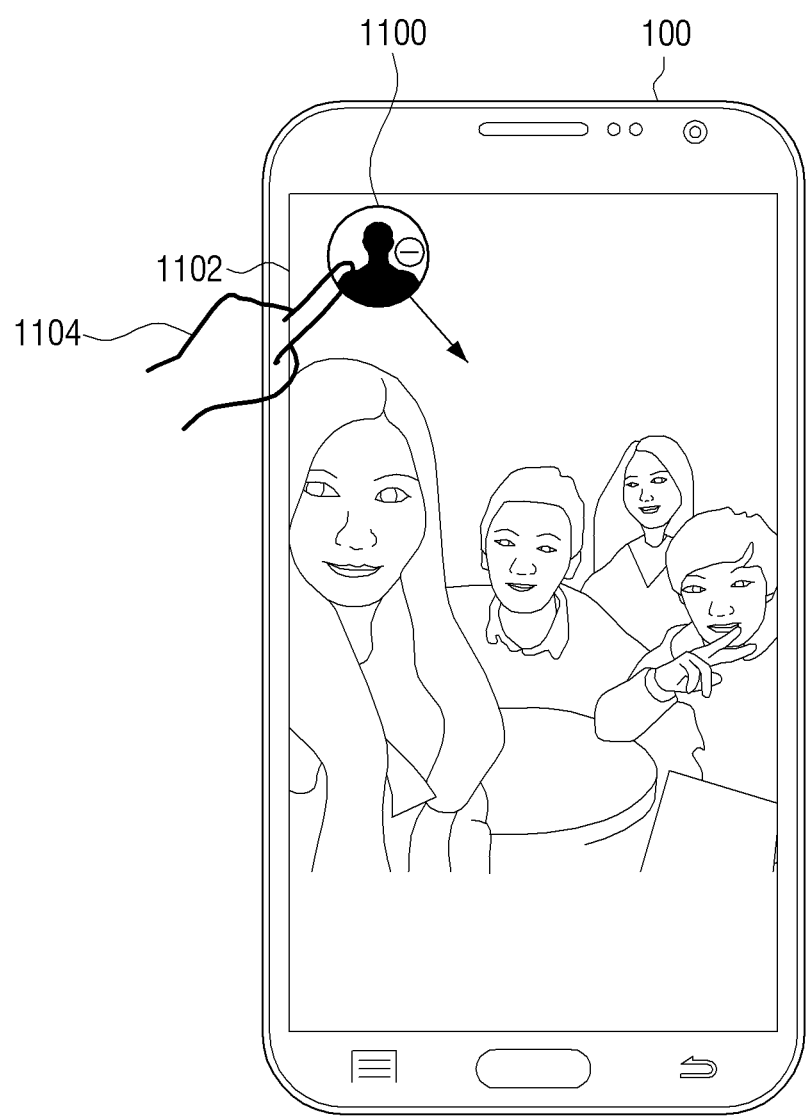
FIGS. 11A and 11B illustrate an example in which an action element of user contact is pinned onto gallery application of an electronic device, according to an exemplary embodiment.
Figure 11B:
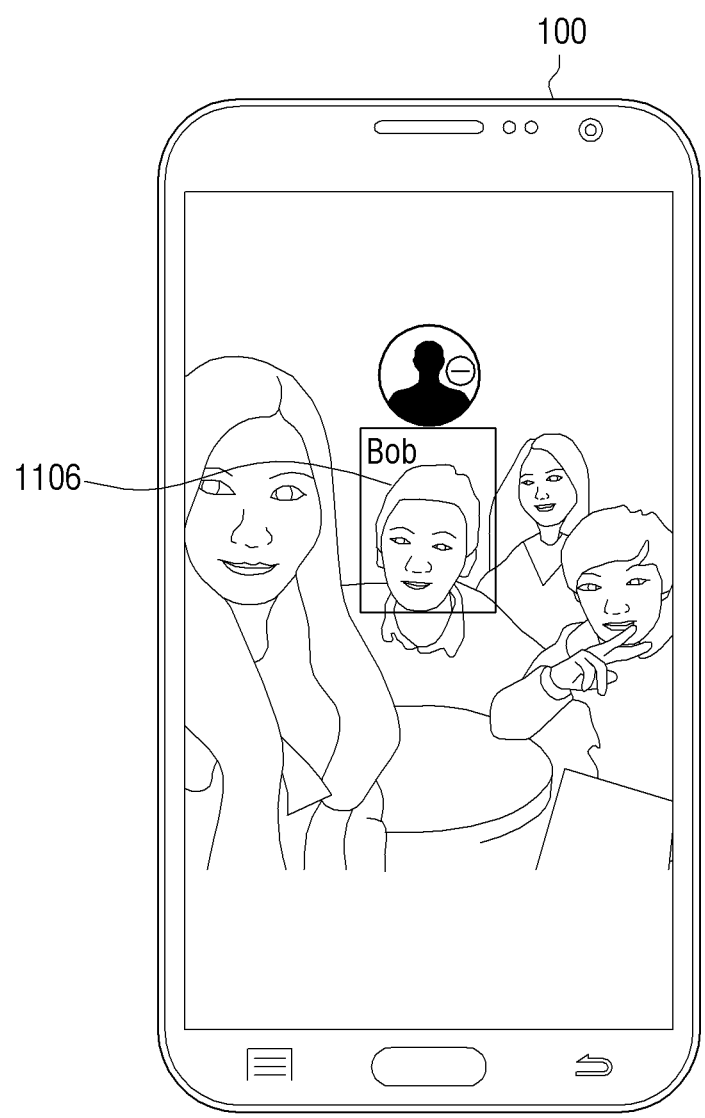

FIGS. 11A and 11B illustrate an example in which an action element 1100 of the user contact is pinned onto gallery application 1102 of the electronic device 100, according to an exemplary embodiment.

Referring to FIG. 11A, the controller 202 may perform the actions based on the user input received on the display 210. For example, when the user performs hold and drag (user input 1104) the pinned contact (action element 1100) to a face (1106) to tag the face with the contact in the gallery application 1102. Thus, the controller 202 may tag the detected face with the action element 1100, as illustrated in FIG. 11B.

FIGS. 12A-12D show an example illustration in which the action elements 1200 and 1202 are pinned onto a notification bar 1204 of the electronic device 100, according to an exemplary embodiment.

Figure 12A:
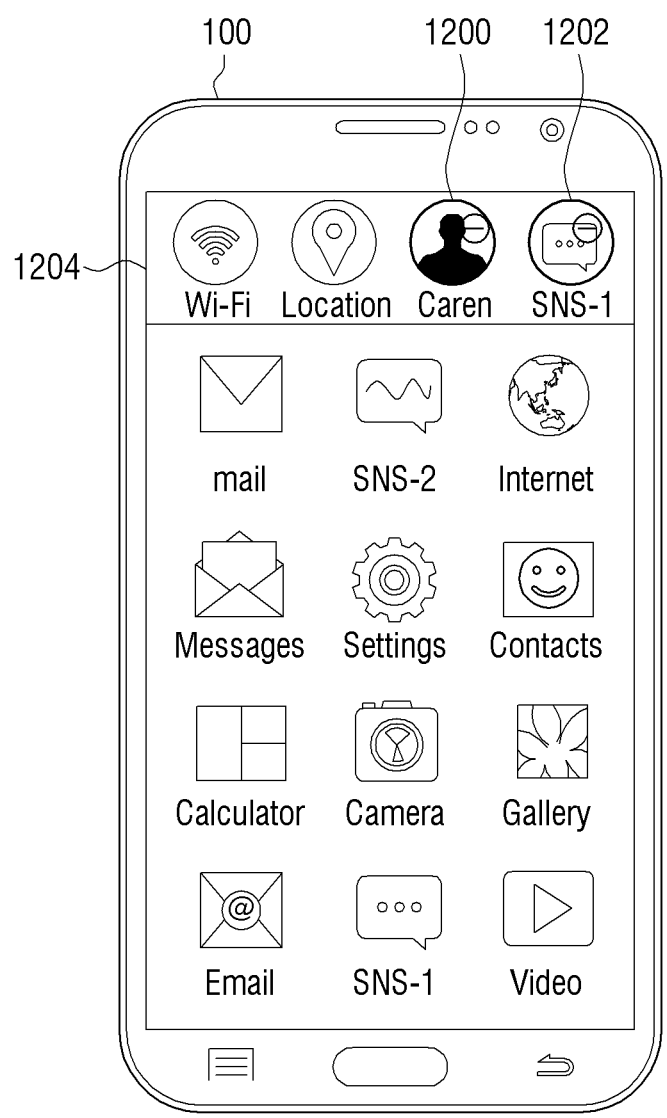
FIGS. 12A, 12B, 12C, and 12D illustrate an example in which action elements are pinned onto a notification bar of the electronic device, according to an exemplary embodiment.
Figure 12B:
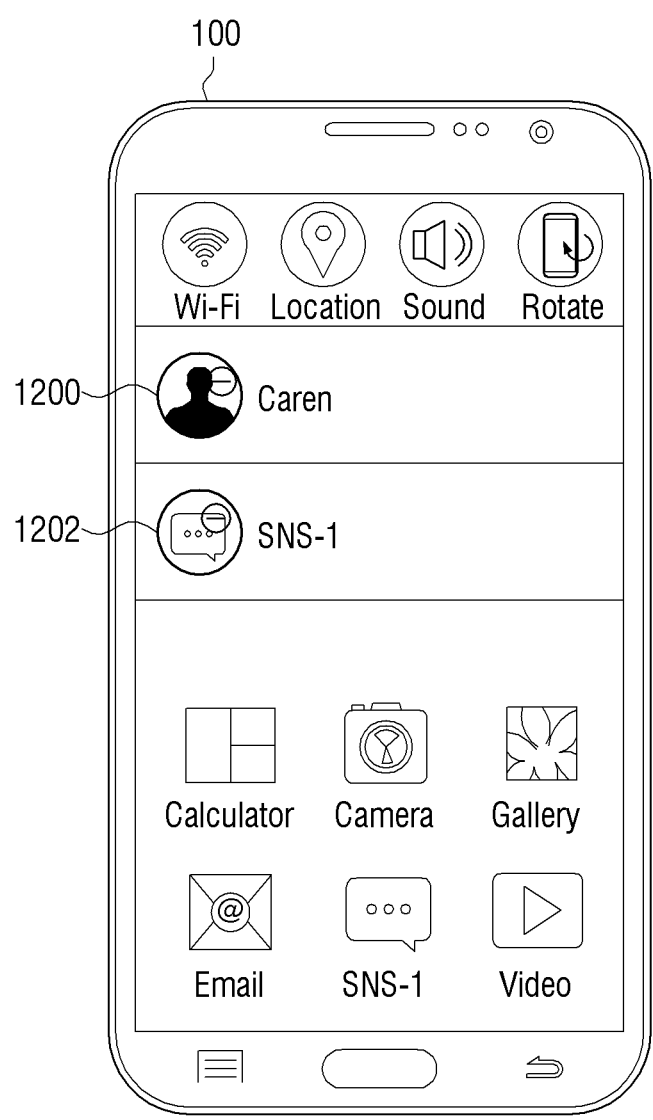

Referring to FIG. 12A the user can add private/special icons on the notification bar 1204 to apply to any current application context with the user input or any other such interaction. In the notification cards, the user can create private/special icon cards that may be applied to various application contexts with the user input or any other such interaction, as illustrated in FIG. 12B.

Figure 12C:
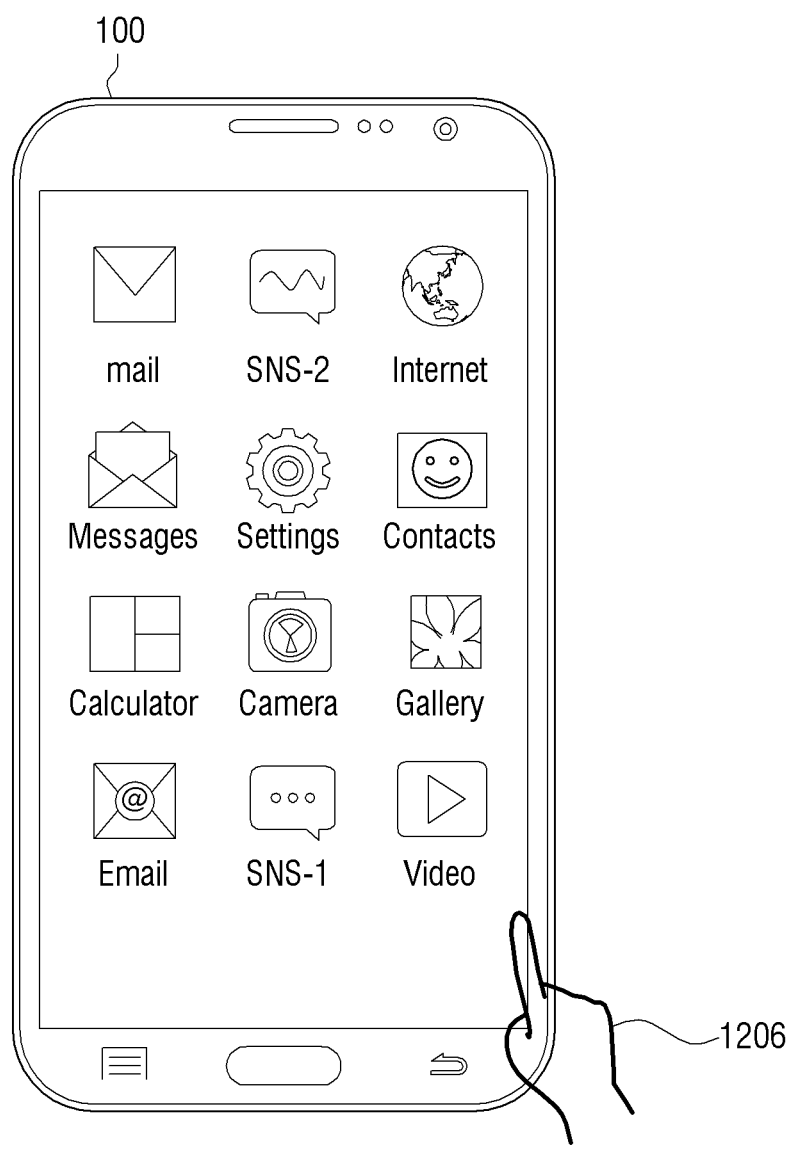
Figure 12D:
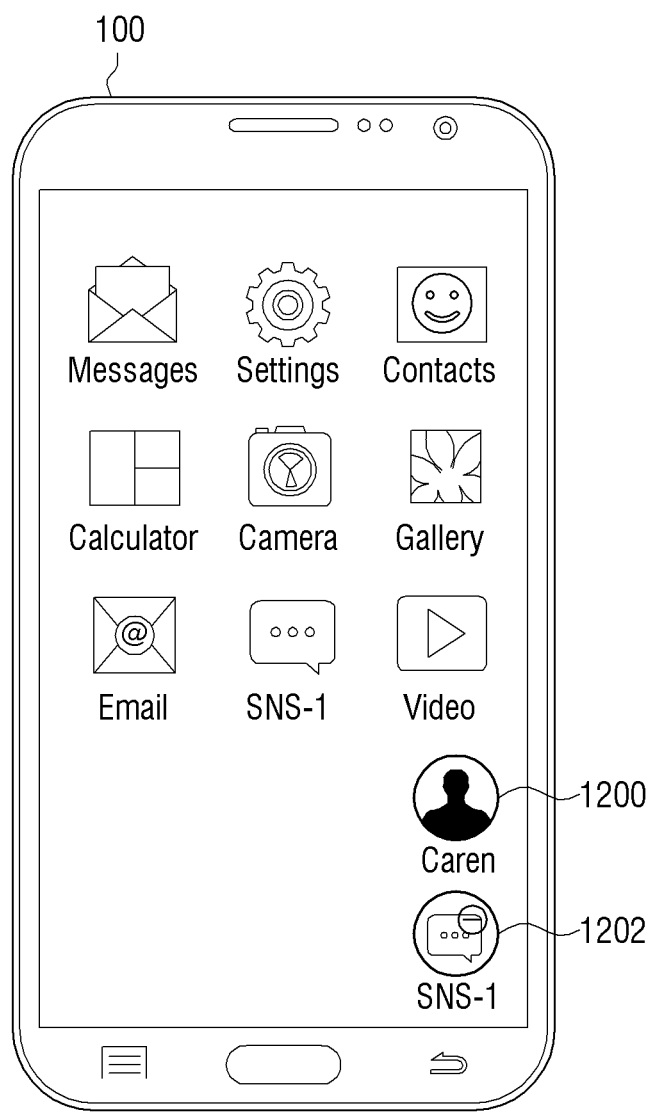

Referring to the FIGS. 12C and 12D, based on a user input 1206 on edge of the display 212, the user may create the action elements 1200 and 1202 with contacts, applications and combinations that may be applied to any application context with user input 1206.

In an example, the first application 102 (example, SNS-1), application-based-action (example, SNS-1 call from SNS-1 application), contacts (example, from the contact application), Folder (example, File manager) may be added onto any of the User Interference (UI) spaces on the electronic device 100 (using three Dimensional (3D)-touch or any such interaction). Thus, a private/special icon is created for the user convenience of applying onto any application context for quick access and action shortcut.

FIGS. 13A-13D show an example illustration for managing the application context and applications suggestion based on the user input 1304 on the action element 1302, according to an exemplary embodiment.

Figure 13A:
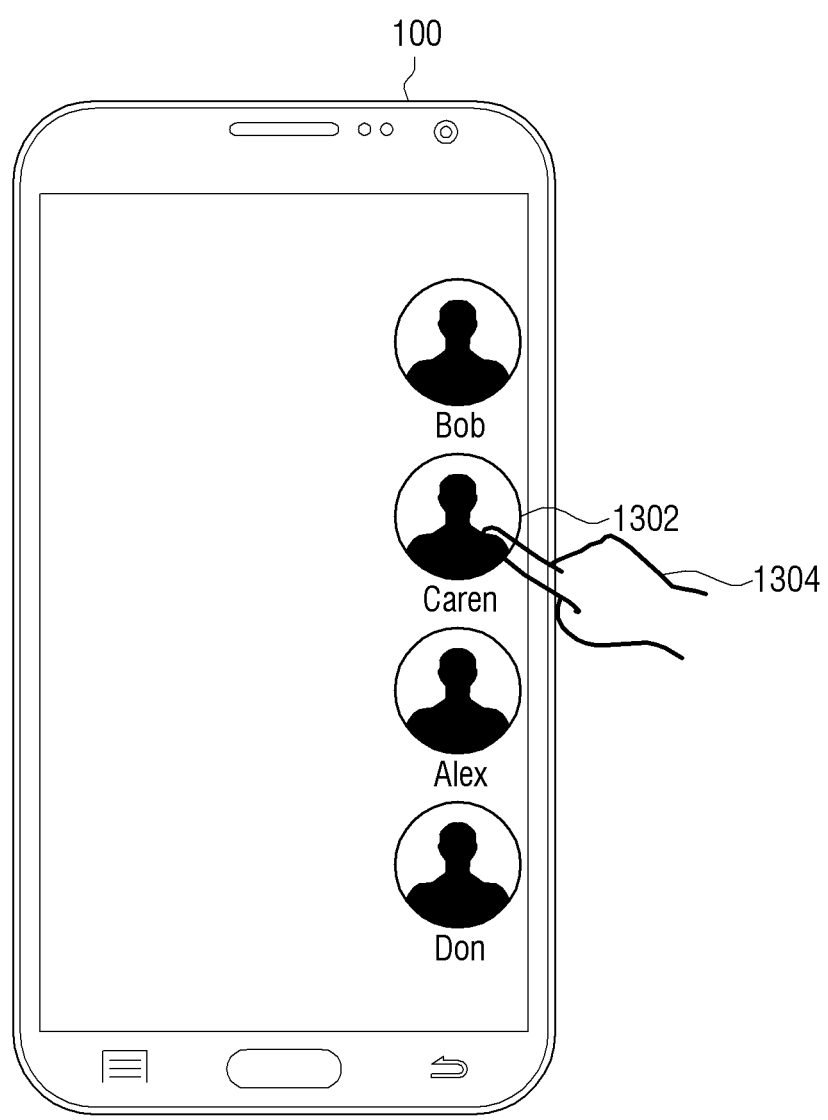
FIGS. 13A, 13B, 13C, and 13D are examples of managing the application context and applications, according to an exemplary embodiment.
Figure 13B:
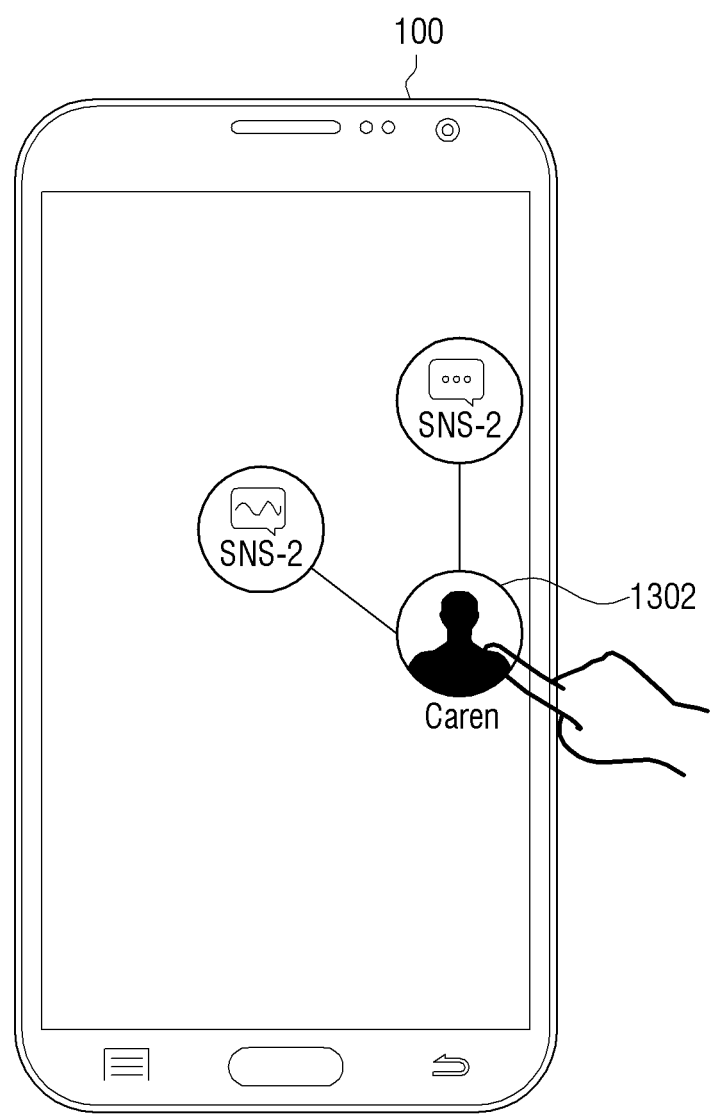

Referring to the FIGS. 13A and 13B, based on the user input 1304 on the action element 1302, the controller 202 coupled to the gesture detection unit 210 may create (i.e., pin) the action element 1302 on the first application 1302 context.

Figure 13C:
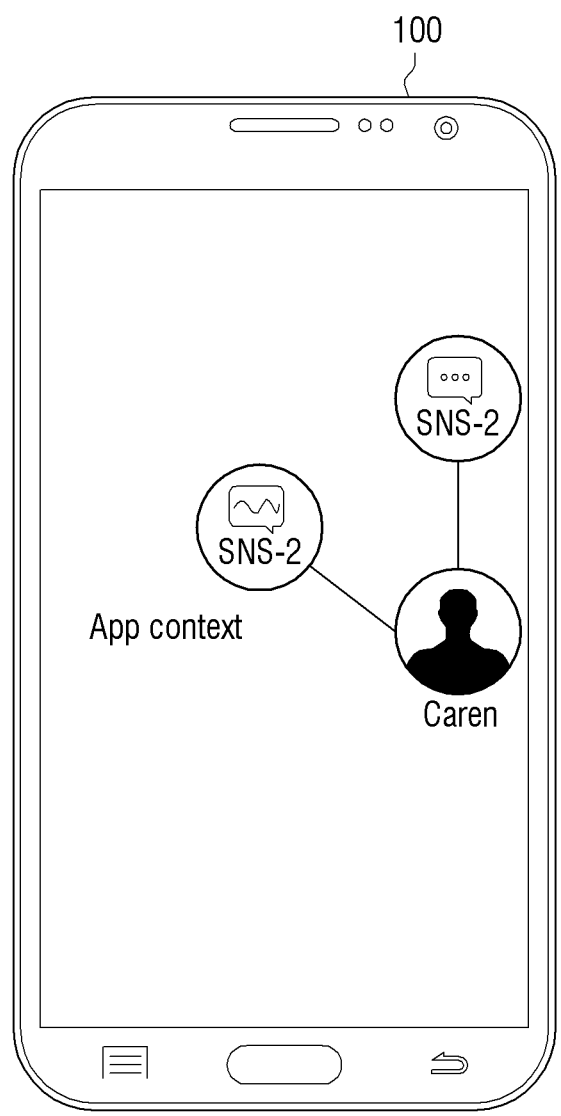
Figure 13D:
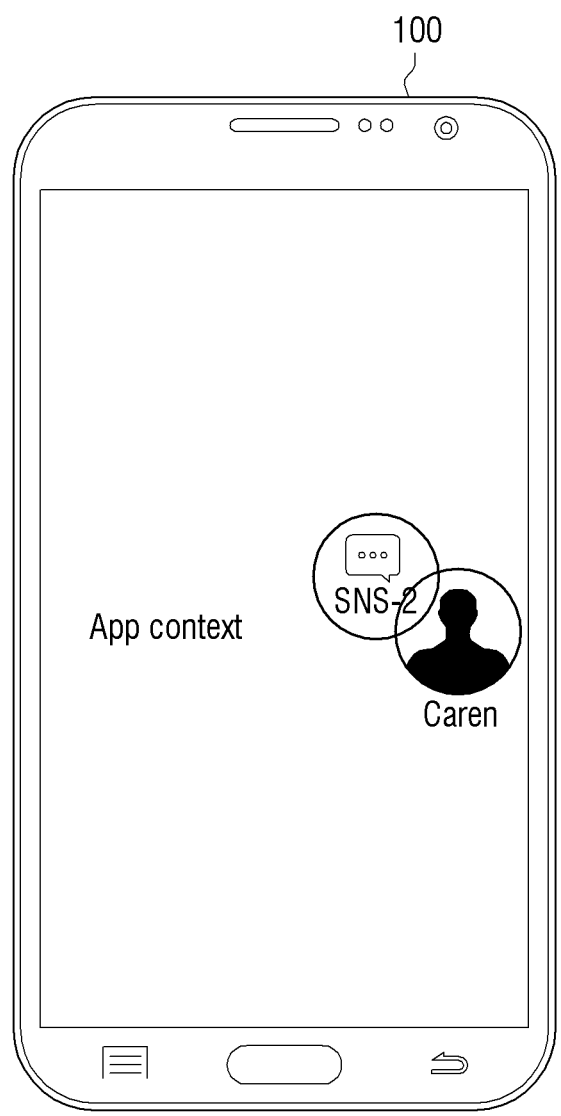

Referring to the FIGS. 13C and 13D, the user input 1304 the action element 1302 may invoke associated application with the action element 1302 (i.e. contact).

In an example, the rules for deriving application context and applications suggestion may include applications that contact is available, applications the user usually posts on with respect to the selected contact, applications with user's/user's contacts' recent check-in info (3rd party apps), SNS applications used to recently contact people (text, chat, like, etc.), applications with birthday/anniversary or any other event info of contacts today/upcoming synced with planner applications.

Figure 14:
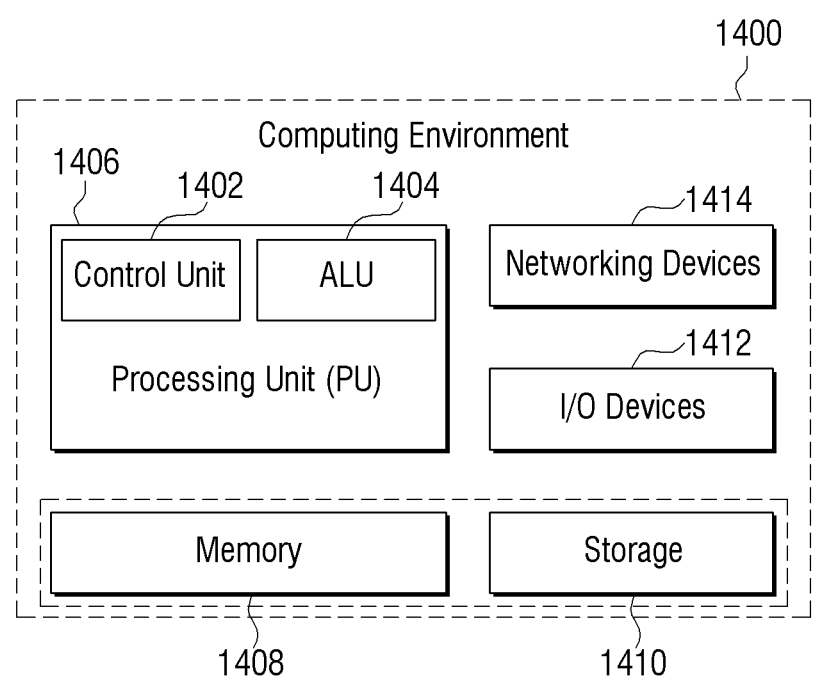
FIG. 14 illustrates a computing environment implementing the method for managing the operations of the applications in the electronic device, according to exemplary embodiments.

FIG. 14 illustrates a computing environment implementing the method for managing the operations of the applications in the electronic device 100, according to exemplary embodiments. As depicted in the FIG. 14, the computing environment 1400 includes at least one processing unit 1406 that is equipped with a control unit 1402 and an Arithmetic Logic Unit (ALU) 1404, a memory 1408, a storage unit 1410, plurality of networking devices 1416 and a plurality Input output (I/O) devices 1412. The processing unit 1406 is responsible for processing the instructions of the exemplary embodiments. The processing unit 1406 receives commands from the control unit in order to perform its processing. Further, any logical and arithmetic operations involved in the execution of the instructions are computed with the help of the ALU 1404.

The overall computing environment 1400 may be composed of multiple homogeneous and/or heterogeneous cores, multiple CPUs of different kinds, special media and other accelerators. The processing unit 1406 is responsible for processing the instructions of the exemplary embodiments. Further, the plurality of processing unit 1406 may be located on a single chip or over multiple chips.

The instructions and codes for implementation of exemplary embodiments may be stored in either the memory 1408 or the storage 1410 or both. At the time of execution, the instructions may be fetched from the corresponding memory 1408 or storage 1410, and executed by the processing unit 1406.

In case of any hardware implementations, various networking devices 1414 or external I/O devices 1412 may be connected to the computing environment to support the implementation through the networking unit and the I/O device unit.

The exemplary embodiments may be implemented through at least one software program running on at least one hardware device and performing network management functions to control the elements. The elements shown in the FIGS. 1 through 14 include blocks which may be at least one of a hardware device, or a combination of hardware device and software module.

The methods explained above may be realized in forms of program commands that may be performed through various computer means, and may then be recorded in computer readable media. The computer readable media may include a program command, data file, or data structure, or a combination thereof. The program commands that may be recorded in the computer-readable media may be those specifically designed and configured for the exemplary embodiments or those well known to one skilled in the art and thus made available. Examples of the computer readable record media include magnetic media such as hard disks, floppy disks and magnetic tape, optical media such as CD-ROMs and DVDs, magneto-optical media such as floptical disks and hardware devices such as ROMs, RAMs and floppy memory specially configured to store and perform program commands. Examples of the program commands include not only machine codes that are made by compilers but also high-level codes that may be executed by computers using interpreters and the like. The hardware devices mentioned above may be configured to operate as one or more software in order to perform the operations of the exemplary embodiments, and vice versa.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for managing operations of applications in an electronic device, the method comprising:
   executing a first application;
   identifying a second application based on a context of the first application;
   displaying one or more action elements related to the identified second application on a screen of the first application;
   pinning, on the screen of the first application which is being executed, an action element selected according to a user input, among the one or more action elements; and
   providing a content obtained from the first application, which is being executed, to the second application, in correspondence with the pinned action element,
   wherein the providing the content comprises at least one of sharing the content of the first application with the pinned action element of the second application or moving the content of the first application to the pinned action element of the second application.

2. The method of claim 1, wherein the method further comprises:
   identifying the one or more action elements based on at least one from among frequently accessed data items, nearby data items, the data items recognized in the content of the first application displayed on a screen of the electronic device, the data items tagged in the content of the first application displayed on the screen of the electronic device, and user favorite data items.

3. The method of claim 1, wherein the user input comprises at least one from among a touch input, a tap input, a force touch input, a touch and drag input, and a long press input.

4. The method of claim 1, wherein the providing the content further comprises at least one from among searching for a data item associated with the second application in the content of the first application, adding the data item associated with the second application to the first application, creating an event associated with the first application based on the data item associated with the second application, and opening a data item interface of the second application.

5. A method for managing operations of applications in an electronic device, the method comprising:
   executing a first application; and
   displaying, on the first application, an action element of a second application based on a context of the first application;
   identifying a user input selecting the action element; and
   providing a content obtained from the first application, which is being executed, to the second application, in correspondence with the selected action element,
   wherein the providing the content comprises at least one of sharing the content of the first application with the selected action element of the second application or moving the content of the first application to the selected action element of the second application, and
   the action element of the second application is dynamically driven based on at least one from among the context of the first application and the content of the first application.

6. The method of claim 5, wherein the providing the content further comprises at least one from among searching for a data item associated with the second application in the content of the first application, adding the data item associated with the second application to the first application, creating an event associated with the first application based on the data item associated with the second application, and opening a data item interface of the second application.

7. The method of claim 5, wherein the method further comprises:
   identifying the action element based on at least one from among frequently accessed data items, nearby data items, the data items recognized in the content of the first application displayed on a screen of the electronic device, the data items tagged in the content of the first application displayed on the screen of the electronic device, and user favorite data items.

8. The method of claim 5, wherein the action element of the second application comprises an indication of a data item associated with the second application.

9. The method of claim 8, wherein the indication of the data item associated with the second application comprises the indication of the data item associated with a third application.

10. The method of claim 5, wherein the displaying the action element of the second application comprises displaying at least one element of a graphical user interface (GUI) corresponding to the second application, on a screen of the first application which is being executed on the electronic device,
    wherein the method further comprises pinning the at least one element of the GUI, which is selected according to the user input among elements of the GUI, on the screen, and
    wherein the at least one of the sharing the content or the moving the content comprises transmitting the content from the first application to the second application, based on the pinned at least one element.

11. The method of claim 10, wherein the displaying the action element of the second application further comprises:
    identifying the second application based on at least one from among time to access an application, user preference, and relevance to the first application.

12. An electronic device for managing operations of applications, the electronic device comprising:
    a display; and
    a processor configured to:
      execute a first application,
      identify a second application based on a context of the first application,
      control the display to display one or more action elements related to the identified second application on a screen of the first application,
      pin, on the screen of the first application which is being executed, an action element selected according to a user input, among the one or more action elements, and
      provide a content obtained from the first application, which is being executed, to the second application, in correspondence with the pinned action element, by performing at least one of sharing the content of the first application with the pinned action element of the second application or moving the content of the first application to the pinned action element of the second application.

13. The electronic device of claim 12, wherein the electronic device further comprises:
    a touch sensor configured to identify the user input, wherein the processor is further configured to provide the content to the second application based on the user input.

14. The electronic device of claim 13, wherein the processor is further configured to perform at least one from among searching for a data item associated with the second application in the content of the first application, adding the data item associated with the second application to the first application, creating an event associated with the first application based on the data item associated with the second application, and opening a data item interface of the second application.

15. The electronic device of claim 13, wherein the user input is performed and identified on the action element of the second application.

16. The electronic device of claim 15, wherein the action element of the second application comprises an indication of a data item associated with the second application.

17. The electronic device of claim 16, wherein the indication of the data item associated with the second application comprises the indication of the data item associated with a third application.

18. The electronic device of claim 12, wherein the processor is further configured to identify the action element based on at least one from among frequently accessed data items, nearby data items, the data items recognized in the content of the first application displayed on a screen of the electronic device, the data items tagged in the content of the first application displayed on the screen of the electronic device, and user favorite data items.

* * * * *